(12) United States Patent
Yan et al.

(10) Patent No.: US 10,825,432 B2
(45) Date of Patent: Nov. 3, 2020

(54) SMART DETECTING AND FEEDBACK SYSTEM FOR SMART PIANO

(71) Applicant: SUNLAND INFORMATION TECHNOLOGY CO., LTD., Shanghai (CN)

(72) Inventors: Bin Yan, Shanghai (CN); Xiaolu Liu, Shanghai (CN); Gang Tong, Shanghai (CN); Zhe Zhu, Shanghai (CN)

(73) Assignee: SUNLAND INFORMATION TECHNOLOGY CO., LTD., Shanghai (CN)

( * ) Notice: Subject to any disclaimer, the term of this patent is extended or adjusted under 35 U.S.C. 154(b) by 0 days.

(21) Appl. No.: 16/382,168

(22) Filed: Apr. 11, 2019

(65) Prior Publication Data

US 2019/0272810 A1    Sep. 5, 2019

Related U.S. Application Data

(63) Continuation of application No. PCT/CN2017/105628, filed on Oct. 11, 2017, which
(Continued)

(51) Int. Cl.
*G10H 1/00* (2006.01)
*G06F 3/042* (2006.01)
(Continued)

(52) U.S. Cl.
CPC ......... *G10H 1/0008* (2013.01); *G06F 3/0426* (2013.01); *G09B 15/06* (2013.01);
(Continued)

(58) Field of Classification Search
CPC ...... G10H 1/0008; G10H 1/34; G10H 1/0016; G10H 1/344; G10H 1/0033;
(Continued)

(56) References Cited

U.S. PATENT DOCUMENTS 3,277,587 A    10/1966    Holcombe et al.
3,726,176 A    4/1973    Kaplan
(Continued)

FOREIGN PATENT DOCUMENTS

CN    101145288 A    3/2008
CN    101388149 A    3/2009
(Continued)

OTHER PUBLICATIONS

International Search Report PCT/CN2017/105628 dated Jan. 12, 2018, 5 pages.
(Continued)

*Primary Examiner* — Jeffrey Donels
(74) *Attorney, Agent, or Firm* — Metis IP LLC

(57) ABSTRACT

A smart musical instrument system for replaying user performance with auto-play, electronic sound source or video, the system may include a musical instrument, a plurality of sensors, and a processing device. The plurality of sensors may be configured to obtain performance data of a user. The plurality of sensors may include a first sensor configured to obtain first performance data of the user. The performance data may include the first performance data indicating operations of a musical instrument. The processing device may be in communication with the plurality of sensors. The processing device may be configured to compare the performance data with reference music data to generate a comparison result and generate feedback based on the comparison result.

20 Claims, 13 Drawing Sheets

Related U.S. Application Data is a continuation-in-part of application No. PCT/CN2016/101794, filed on Oct. 11, 2016.

(51) Int. Cl.
    *G10H 1/34*         (2006.01)
    *G09B 15/06*      (2006.01)
    *G06K 9/00*       (2006.01)

(52) U.S. Cl.
CPC ......... *G10H 1/0016* (2013.01); *G10H 1/0033* (2013.01); *G10H 1/34* (2013.01); *G10H 1/344* (2013.01); *G06K 9/00302* (2013.01); *G06K 9/00382* (2013.01); *G10H 2210/066* (2013.01); *G10H 2210/076* (2013.01); *G10H 2210/081* (2013.01); *G10H 2210/091* (2013.01); *G10H 2220/305* (2013.01); *G10H 2220/311* (2013.01); *G10H 2220/326* (2013.01); *G10H 2220/331* (2013.01); *G10H 2220/371* (2013.01); *G10H 2220/395* (2013.01); *G10H 2220/411* (2013.01); *G10H 2220/455* (2013.01); *G10H 2240/105* (2013.01); *G10H 2240/211* (2013.01)

(58) Field of Classification Search
CPC ....... G10H 2220/311; G10H 2220/326; G10H 2240/211; G10H 2220/305; G10H 2240/105; G10H 2220/395; G10H 2220/455; G10H 2220/411; G10H 2220/371; G10H 2220/331; G10H 2210/091; G10H 2210/066; G10H 2210/081; G10H 2210/076; G09B 15/06; G06F 3/0426; G10F 1/02; G10F 1/00; G06K 9/00355; G06K 9/00302; G06K 9/00382
See application file for complete search history.

(56) References Cited

U.S. PATENT DOCUMENTS

| | | | |
|---|---|---|---|
| 6,137,041 A | 10/2000 | Nakano | |
| 6,262,355 B1 | 7/2001 | Koch | |
| 6,275,213 B1 | 8/2001 | Tremblay et al. | |
| 6,380,923 B1 | 4/2002 | Fukumoto et al. | |
| 6,426,455 B2 | 7/2002 | Hasegawa | |
| 6,636,763 B1 | 10/2003 | Junker et al. | |
| 6,982,375 B2 | 1/2006 | McGregor | |
| 7,009,100 B2 | 3/2006 | Ando | |
| 7,189,909 B2 | 3/2007 | Vinoly | |
| 7,378,585 B2 | 5/2008 | McGregor | |
| 7,390,157 B2 | 6/2008 | Kramer | |
| 7,582,825 B2 | 9/2009 | Chien et al. | |
| 8,106,283 B2 | 1/2012 | Nishitani | |
| 8,368,641 B2 | 2/2013 | Tremblay et al. | |
| 9,269,340 B2 | 2/2016 | Udell, III | |
| 9,542,920 B2 | 1/2017 | Udell, III | |
| 9,697,739 B1* | 7/2017 | Goncalves | G09B 15/023 |
| 10,008,190 B1 | 6/2018 | Elson | |
| 2001/0015123 A1* | 8/2001 | Nishitani | A63B 71/0686 84/615 |
| 2001/0029830 A1 | 10/2001 | Rosen | |
| 2001/0032539 A1 | 10/2001 | Chantzis et al. | |
| 2002/0002896 A1 | 1/2002 | Hasegawa | |
| 2003/0066413 A1 | 4/2003 | Nishitani et al. | |
| 2003/0167908 A1 | 9/2003 | Nishitani et al. | |
| 2004/0055441 A1* | 3/2004 | Katsuta | G09B 15/00 84/470 R |
| 2004/0123726 A1* | 7/2004 | Kato | G10H 1/0008 84/609 |
| 2004/0244570 A1* | 12/2004 | Ando | G10H 1/0016 84/744 |
| 2006/0185502 A1 | 8/2006 | Nishitani et al. | |
| 2006/0287770 A1 | 12/2006 | Ishihara et al. | |
| 2009/0019990 A1* | 1/2009 | Chien | G09B 15/08 84/478 |
| 2010/0022287 A1 | 1/2010 | Chiwata | |
| 2010/0037753 A1 | 2/2010 | Wagner | |
| 2010/0257993 A1* | 10/2010 | Brow | G09B 15/02 84/478 |
| 2010/0263518 A1 | 10/2010 | Nishitani et al. | |
| 2011/0132181 A1* | 6/2011 | Kockovic | G10H 1/34 84/723 |
| 2011/0146476 A1 | 6/2011 | Zimmerman | |
| 2011/0259176 A1* | 10/2011 | Pillhofer | G09B 15/002 84/470 R |
| 2012/0167747 A1* | 7/2012 | Luchinskiy | G09B 15/008 84/485 R |
| 2012/0227572 A1 | 9/2012 | Barosso et al. | |
| 2013/0205975 A1 | 8/2013 | Williams | |
| 2014/0076123 A1 | 3/2014 | Tanaka | |
| 2014/0090547 A1 | 4/2014 | Udell, III | |
| 2014/0251114 A1* | 9/2014 | Yoshikawa | G09B 15/08 84/478 |
| 2015/0099247 A1 | 4/2015 | Bryant | |
| 2015/0317910 A1* | 11/2015 | Daniels | G16H 20/30 84/485 R |
| 2015/0367239 A1 | 12/2015 | Epstein | |
| 2016/0125864 A1 | 5/2016 | Udell, III | |
| 2016/0253915 A1 | 9/2016 | Lee et al. | |
| 2017/0109127 A1 | 4/2017 | Osborn et al. | |
| 2018/0107370 A1 | 4/2018 | Ludwig | |
| 2018/0321841 A1* | 11/2018 | Lapp | G06F 3/04886 |
| 2018/0322856 A1 | 11/2018 | Liu et al. | |
| 2018/0342229 A1 | 11/2018 | Yan et al. | |
| 2019/0057677 A1 | 2/2019 | Elson | |

FOREIGN PATENT DOCUMENTS

| | | |
|---|---|---|
| CN | 201429912 Y | 3/2010 |
| CN | 101853650 A | 10/2010 |
| CN | 103150940 A | 6/2013 |
| CN | 203025989 U | 6/2013 |
| CN | 104200716 A | 12/2014 |
| CN | 204990837 U | 1/2016 |
| CN | 105391764 A | 3/2016 |
| CN | 105741826 A | 7/2016 |
| CN | 205388737 U | 7/2016 |
| CN | 105845119 A | 8/2016 |
| CN | 105895066 A | 8/2016 |
| CN | 205541912 U | 8/2016 |
| JP | 2006162916 A | 6/2006 |
| JP | 4262717 B2 | 5/2009 |
| KR | 20080085340 A | 9/2008 |

OTHER PUBLICATIONS

International Search Report in PCT/CN2016/101794 dated Jun. 30, 2017, 5 pages.
Written Opinion in PCT/CN2017/105628 dated Jan. 12, 2018, 4 pages.
Written Opinion in PCT/CN2016/101794 dated Jun. 30, 2017, 4 pages.
First Office Action in Chinese application No. 201680089881.6 dated Aug. 5, 2020, 24 pages.

\* cited by examiner

SMART DETECTING AND FEEDBACK SYSTEM FOR SMART PIANO

CROSS-REFERENCE TO THE RELATED APPLICATIONS

This application is a Continuation of International Application No. PCT/CN2017/105628, filed on Oct. 11, 2017, which claims priority of International Application No. PCT/CN2016/101794, filed on Oct. 11, 2016, the entire contents of each of which are hereby incorporated by reference.

TECHNICAL FIELD

This application relates to a smart piano system, and more particularly, to a smart detecting and feedback system and method for a smart piano.

BACKGROUND

A piano (e.g., an acoustic piano) is a musical instrument played using a keyboard. The piano may include a protective case, a soundboard, metal strings, hammers, keys (e.g., white keys and black keys), and pedals. The keys may be mechanically connected to hammers. When a key of the acoustic piano is pressed by a player, a hammer may strike the metal strings and the strings may vibrate at their respective resonant frequency. These vibrations may be transmitted to the soundboard and amplified by coupling the acoustic energy to the air. A note produced by the piano may be sustained, by application of one or more pedals of the piano, even when the keys are released.

As one of the world's most popular musical instruments, the piano is widely played and studied today. A piano student (especially a beginning student) may find it difficult to learn fingering and hand positions, fingering sequences, pedaling techniques, and other piano techniques. Accordingly, it is desirable to provide a smart detecting and feedback system and method to assist in learning piano.

SUMMARY OF THE INVENTION

According to an aspect of the present disclosure, a smart musical instrument system for replaying user performance with auto-play, electronic sound source or video, the system may include a musical instrument, a plurality of sensors, and a processing device. The plurality of sensors may be configured to obtain performance data of a user. The plurality of sensors may include a first sensor configured to obtain first performance data of the user. The performance data may include the first performance data indicating operations of a musical instrument. The processing device may be in communication with the plurality of sensors. The processing device may be configured to compare the performance data with reference music data to generate a comparison result, and generate feedback based on the comparison result.

According to another aspect of the present disclosure, a method for operating a smart musical instrument system for replaying user performance with auto-play, electronic sound source or video, the method may include: obtaining performance data of a user by a plurality of sensors, comparing the performance data with reference music data to generate a comparison by a processing device; and generating feedback based on the comparison result by the processing device. The plurality of sensors may include a first sensor. The performance data may include first performance data indicating operations of a musical instrument obtained by the first sensor.

BRIEF DESCRIPTION OF THE DRAWINGS

The present disclosure is further described in terms of exemplary embodiments. These exemplary embodiments are described in detail with reference to the drawings. These embodiments are non-limiting exemplary embodiments, in which like reference numerals represent similar structures throughout the several views of the drawings, and wherein.

DETAILED DESCRIPTION

Subject matter will now be described more fully hereinafter with reference to the accompanying drawings, which form a part hereof, and which show, by way of illustration, specific example embodiments. Subject matter may, however, be embodied in a variety of different forms and, therefore, covered or claimed subject matter is intended to be construed as not being limited to any example embodiments set forth herein; example embodiments are provided merely to be illustrative. Likewise, a reasonably broad scope for claimed or covered subject matter is intended. Among other things, for example, subject matter may be embodied as methods, devices, components, or systems. The following detailed description is, therefore, not intended to be limiting on the scope of what is claimed.

Throughout the specification and claims, terms may have nuanced meanings suggested or implied in context beyond an explicitly stated meaning. Likewise, the phrase "in one embodiment" as used herein does not necessarily refer to the same embodiment and the phrase "in another embodiment" as used herein does not necessarily refer to a different embodiment. It is intended, for example, that claimed subject matter includes combinations of example embodiments in whole or in part.

In general, terminology may be understood at least in part from usage in context. For example, terms, such as "and", "or", or "and/or," as used herein may include a variety of meanings that may depend at least in part upon the context in which such terms are used. Typically, "or" if used to associate a list, such as A, B or C, is intended to mean A, B, and C, here used in the inclusive sense, as well as A, B or C, here used in the exclusive sense. In addition, the term "one or more" as used herein, depending at least in part upon context, may be used to describe any feature, structure, or characteristic in a singular sense or may be used to describe combinations of features, structures or characteristics in a plural sense. Similarly, terms, such as "a," "an," or "the," again, may be understood to convey a singular usage or to convey a plural usage, depending at least in part upon context. In addition, the term "based on" may be understood as not necessarily intended to convey an exclusive set of factors and may, instead, allow for existence of additional factors not necessarily expressly described, again, depending at least in part on context.

Figure 1:
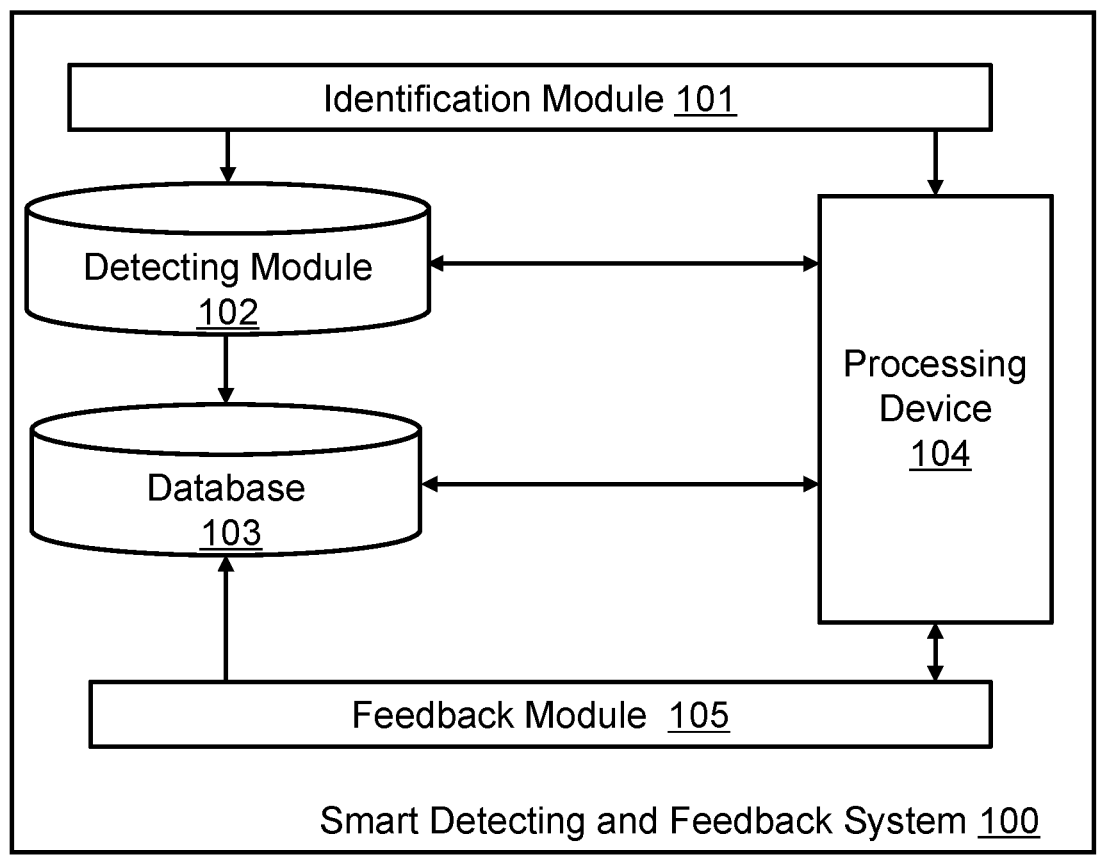
FIG. 1 is a block diagram illustrating an example of a smart detecting and feedback system 100 in accordance with some embodiments of the present disclosure.

FIG. 1 illustrates an example of a smart detecting and feedback system 100 in accordance with some embodiments of the present disclosure. The smart detecting and feedback system 100 may be configured to connect to a music instrument. The music instrument may include but is not limited to one or more keyboard instruments, percussion, stringed instruments, or the like, or a combination thereof. For example, the keyboard instrument may include but is not limited to a piano, an organ, a piano accordion, and/or an electronic keyboard. The percussion may include but is not limited to a xylophone, a celesta, a drum kit, and/or a drum. The stringed instruments may include but is not limited to a violin, a harp, a guitar, an electric guitar, and/or bass. In some embodiments, the music instrument may also include a smart piano.

The smart detecting and feedback system 100 may be configured to obtain and process user performance data and generate a feedback content to a user based on user performance. As illustrated, the smart detecting and feedback system 100 may include an identification module 101, a detecting module 102, a database 103, a processing device 104, and a feedback module 105.

Here and also throughout the present disclosure, a module may be implemented in many different ways and as hardware, software or in different combinations of hardware and software. For example, all or parts of a module implementations may be a processing circuitry that may include part or all of an instruction processor, such as a central processing unit (CPU), a microcontroller, a microprocessor; or an application specific integrated circuit (ASIC), a digital signal processor (DSP), a digital signal processing device (DSPD), a programmable logic device (PLD), a field programmable gate array (FPGA), a controller, other electronic components; or as circuitry that includes discrete logic or other circuit components, including an analog circuit component, a digital circuit component or both; or any combination thereof. The circuitry may include discrete interconnected hardware components or may be combined on a single integrated circuit die, distributed among multiple integrated circuit dies, or implemented in a Multiple Chip Module (MCM) of multiple integrated circuit dies in a common package, as examples.

The identification module 101 may be configured to identify a user who accesses the smart detecting and feedback system 100. The user may be a student, or may be a teacher, or may be a musician intends to use the smart detecting and feedback system 100. In some embodiments, the user may have a registered account in the smart detecting and feedback system 100 and have his or her personal information stored therein, so that the identification module 101 may be able to identify the user when the user is trying to use the smart detecting and feedback system 100.

In some embodiments, for different users, the smart detecting and feedback system 100 may identify a user identity based on the identification module 101. The smart detecting and feedback system 100 may establish a database of personal information and generate a personal feedback content for each individual user. In some embodiments, the user may use the smart detecting and feedback system 100 without the identification module 101.

The identification module 101 may identify the user through various means. In some embodiments, the user may use a mobile phone or other smart terminals to scan a two-dimension code to enter the smart detecting and feedback system 100. In some embodiments, a user may have user-specific portal authentication data to access the smart detecting and feedback system 100, such as by visiting a webpage that the smart detecting and feedback system 100 is associated with and inputting a user ID and a password through the webpage. In some embodiments, the smart detecting and feedback system 100 may include a fingerprint scanner and may store fingerprint information of an individual user, so that it may identify the user by his or her fingerprint. Similarly, with a facial recognition circuit or bar code scanner, the smart detecting and feedback system 100 may also identify a user by facial recognition or a bar code. The smart detecting and feedback system 100 may also include any hardware or software which may be used to identify a user. In some embodiments, a user may enter the smart detecting and feedback system 100 by a remote server connecting therewith and obtain user performance data of the user.

The detecting module 102 may be configured to detect information related to user performance. The information may relate to or be used to assess user performance. The information may include physiological information, a physical information, or the like, or a combination thereof. For example, the physiological information may include user emotion, attitude, or the like, or any physiological information which may relate to user performance. The physical information may include but is not limited to speed, pressure, position, strength, gesture, sound or the like, or a combination thereof. For example, when the instrument includes one or more keys or strings, the physical information may also include but is not limited to information about one or more keys or strings of the instrument that are pressed during performance, strength of pressing the keys or string, timing information about the keys or strings of the instrument (e.g., a time instant corresponding to a position of a key or vibration status of a string of the instrument), one or more operation sequences of the keys or strings of the instrument, timing information and musical notes produced according to motions of the keys/pedals or strings of the instrument. In some embodiments, the user information may also include but is not limited to information about learning style, learning receptivity, learning rate, user playing custom, musical skill level, hobbies, experience, ability, or the like. The detecting module 102 may include any suitable device that is capable of collecting user information, processing the user information, generating signals based on the user information, transmitting the signals to database 103 and/or the processing device 104 or performing any other function.

The detecting module 102 may include a physical signaling device configured to detect physical information of the user, a physiological signaling device configured to detect physiological information of the user, a smart accessory, or any other detecting devices that may obtain user information.

The physical signaling device may be configured to obtain physical information, such as a playing speed, a key pressure or a string vibration, a key or string position, a user gesture, sound, or the like, or a combination thereof. The physical signaling device may include a sensor, a camera, a microphone, or the like, which may obtain physical information.

The sensor may include but is not limited to, an accelerometer, a force sensing resistor (FSR), sonar, an infrared (IR) sensor, a photo sensor, an inertia measurement unit (IMU) sensor, an Attitude/Heading Reference System (AHRS) sensor, a temperature sensor, conductive rubber, or a general purpose motion or orientation sensor. In some embodiments, the sensor may be a sound (volume, power, or frequency) measurement device.

The microphone may include any suitable device which may detect sound and convert sound signal to electric signal. The microphone may be electric type (moving coil, ribbon), capacitance type (DC polarization), piezoelectric type (crystal, ceramic), electromagnetic type, carbon type, semiconductor type, or the like, or a combination thereof. In some embodiments, the microphone may be a Micro Electrical-Mechanical System (MEMS) microphone.

The camera may include any suitable device which may obtain an image and convert the image to an electric signal. The camera may include but is not limited to a video photometer, an infrared scanner, a video camera, or the like.

The physiological signaling device may be configured to detect and/or obtain physiological information, such as user emotion, attitude and other physiological information. The physiological information may be assessed by obtaining brain waves, a heart rate, micro-expression, a blood pressure, a pulse, or the like, or a combination thereof.

The smart accessory may include any suitable device which may obtain physical information and physiological information or any other user information, such as a smart-band, a smart-ring, a smart-watch, a mobile phone, a smart-glove, a smart glass, or the like, or a combination thereof. In some embodiments, the smart accessory may be configured as an accelerometer, a force sensing resistor (FSR), a sonar, an infrared (IR) sensor, a photo sensor, an inertial measurement unit (IMU) sensor, an Attitude/Heading Reference System (AHRS) sensor, a temperature sensor, a general purpose motion, an orientation sensor, or the like, or a combination thereof.

In some embodiments, the detecting module 102 may also perform functions of processing, transmitting information, and displaying a feedback content.

The detecting module 102 may be connected to or communicate with the database and the processing device 104 via a wireless connection or a wired connection. For example, the detecting module 102 may transmit the information to the processing device 104 via Bluetooth.

The database 103 may be configured to store information, such as data, program, instructions, or the like, or a combination thereof. The information may be provided by the identification module 101, the detecting module 102, the processing device 104, and/or the feedback module 105.

In some embodiments, the database 103 may be configured to store user information obtained from the detecting module 102. In some embodiments, the database 103 may be configured to store the information about music data, such as a music score, a music teaching video, musician performance, standard performance data generated automatically by the processing device 104 based on the performance data of a user, or the like. In some embodiments, the database 103 may be configured to store the data generated when the smart detecting and feedback system 100 in working condition. In some embodiments, the database 103 may be configured to store some parameters set by the user, e.g., a parameter indicating whether a special sign should be detected. The special sign may include a decorative note, a repeat sign, or the like. The decorative note may include an appoggiatura, a mordent, a trill, a turn, a glissando, a slide, or the like, or a combination thereof. The parameters may also include parameters indicating whether a music note should be skipped if it was detected to be played in a wrong way for a number of times continuously, e.g., from 1 to 5 times, from 6 to 10 times. The parameters may also include parameters indicating the speed of playing which could be set by a user, parameters indicating whether to ignore a note played incorrectly by a user with a relatively high speed when other neighboring notes are played correctly, parameters indicating whether a user could choose to stop during playing and/or go back to re-play the section which the user has made a mistake in playing, or the like, or a combination thereof.

The database 103 may be any storage device. The database 103 may be local, or remote. The database 103 may include but is not limited to a hierarchical database, a network database, a relational database, or the like, or a combination thereof. The database 120 may be a storage device to store information with electric energy, such as a variety of memory, a random access memory (RAM), a read only memory (ROM) and the like. The random access memory (RAM) may include but not limited to a decimal counter, a select the number of tubes, a delay line memory, a Williams tube, a dynamic random access memory (DRAM), a static random access memory (SRAM), a thyristor random access memory (T-RAM), a zero capacitor random access memory (Z-RAM) or a combination thereof. The read only memory (ROM) may Include but not limited to a read-only memory bubble memory, a magnetic button line memory, a memory thin film, a magnetic plate line memory, a core memory, a magnetic drum memory, a CD-ROM drive, a hard disk, a magnetic tape, a nonvolatile memory early (the NVRAM), a phase change memory, a magnetoresistive random access memory module, a ferroelectric random access memory, a nonvolatile SRAM, a flash memory, a type of electronic erasing rewritable read-only memory, an erasable programmable read-only memory, a programmable read-only memory, a shielded heap read in combination with one or more of memory, a floating connecting doors random access memory, a nano random access memory, a racetrack memory, a variable resistive memory, a programmable metallization cell and the like, or a combination thereof. The database 103 may be a storage device to store information with magnetic energy such as a hard disk, a floppy disk, a magnetic tape, a magnetic a core memory, a bubble memory, an U disk, a flash memory or the like, or a combination thereof. Database 103 may be a storage device to store information with optics such as a CD, DVD, or the like, or a combination thereof. Database 103 may be random access memory, the serial access storage, read-only memory or the like, or a combination thereof. The database 103 may be a non-permanent memory, or a permanent storage memory. The storage devices mentioned above are only some examples, the database 103 in the working environment is not limited thereof.

The processing device 104 may be configured to process and analyze information, and generate a feedback content. The information may be obtained from the identification module 101, the detecting module 102, the database 103, the feedback module 105, or any device which may store information. The processing device 104 may be a computational device and may include additional functions of connecting or communicating with the identification module 101, the detecting module 102, the database 103, the feedback module 105 or any device which may receive or transmit information.

In some embodiments, when a user play a piece of music, the processing device 104 may obtain an image information from a camera, identify the image, extract user posture information, and output reminder information about a right posture. In some embodiments, the processing device 104 may include a function to calculate a music score to be displayed on a screen.

In some embodiments, the processing device 104 may be separated from a music instrument. In such embodiments, the processing device 104 may communicate with the music instrument, via a short-range communication (e.g., Bluetooth), via a wireless connection (e.g., Wi-Fi), via a wired connection (e.g., a universal serial bus or "USB"), or via some other connection types.

In some embodiments, the processing device 104 may be integrated with the music instrument as a single unit. In some embodiments, the processing device may be a computer device which may be used as a processing device by installing software with the general purpose computer. For example, the processing device 104 may be a tablet computer system that includes software configured to perform the functions of processing and analyzing information and generating a feedback content.

In some embodiments, the processing device 104 may communicate with a remote server. The server may be cloud-based. The server may perform functions of retrieving, processing, analyzing and storing information. The processing device 104 may obtain information from the server.

The feedback module 105 may be configured to present a feedback content related to user performance. The feedback content may include information to inform and/or remind the user, in real-time while a user is playing a music, the difference between the user's performance and a reference performance. For example, the feedback content may be of the form of audio content, video content, images, text, graphics, electric shock, vibration, or the like, or a combination thereof. The feedback module 105 may obtain information from the processing device 104 and communicate with database 103 via a wireless connection or a wired connection.

The feedback module 105 may include but is not limited to display devices, printing devices, plotters, an image output system, a speech output system, a magnetic recording apparatus or the like, or any device which may display, reminder, suggest, alert, or teach user about performance. In some embodiments, the feedback module 105 may play simultaneously inputs and outputs, for example, desktop computers, laptops, smart phones, tablet computers, personal digital assistants (personal digital assistance, PDA), etc.

In some embodiments, the feedback module 105 may include a display device that may present contents related to the performance of a user, music played in the performance, another performance of the music, and/or any other information. In some embodiments, the size of a screen of the display device may be adapted to the size of a keyboard of the piano. A virtual keyboard may be displayed on the screen. The virtual keyboard can include multiple virtual keys corresponding to actual keys of the piano. In some embodiments, the number of the virtual keys and the number of the actual keys may be the same. Information about one or more operations to be performed on an actual piano key may be displayed in a portion of the screen including its corresponding virtual key. Such information may include, for example, timing information related to depression and/or release of the actual piano key, a strength to be applied to the actual piano key, a note duration, a note value, etc. In some embodiments, various types of information may be presented on the screen during the performance.

In some embodiments, the feedback module 105 may display how to play a musical note, a group of musical notes, or a portion of a music score, illustrate a musical notation, or point out a performance error made by a user playing the musical instrument.

In some embodiments, the feedback module 105 may provide a user a stage summary. The stage summary may include information about user for a period learning experience, such as an accustomed error (e.g. an error caused by a user's habit), a suggestion, an evaluation, personalize lessons, a user psychological state, or any information related to user performance. The accustomed error may include but is not limited to a note error, a timing error to press one or more keys or pedals, or the like, or a combination thereof. The note error may refer that the user plays a wrong note. For example, the user should play "Note A", but the user plays "Note B". As another example, the user may play a decorative note in a wrong way. In some embodiments, the user may play two certain keys alternately by several times during a trill playing. If the user does not play more than a certain number of times required by the music score, then the processing device 104 may determine that the user plays the trill in a wrong way. In some embodiments, a mordent may be played with a single rapid alternation with an adjacent note above or below. If the user go into the wrong adjacent note during playing, the processing device 104 may consider that the user plays the mordent in a wrong way. The timing error may refer to an error that a user play a right note but at a wrong time instance, and/or an error that a user plays right notes but there are wrong intervals between playing the notes. For example, the user should play a certain note for 8 beats, but the user just plays the note for 4 beats. As such, the feedback module 105 may provide a user (e.g., a player, a piano student, etc.) with visualized and personalized piano learning experience.

The different modules may be connected or communicate directly or indirectly with each other via a wireless connection or a wired connection. The wireless may be Bluetooth, WLAN, Wi-Fi, Zigbee, Z-Wave, EnOcean, infra-red data association (IrDA), Ultra Wideband (UWB), Near Field Communication Services (NFC), mobile networks (2G, 3G or 4G signal), VPN, shared network, or the like, or a combination thereof. The communication protocol may be Transmission Control Protocol (TCP), User Data Protocol (UDP), Internet Protocol (TP), Hypertext transfer Protocol (HTTP), File Transfer Protocol (FTP), Simple Mail Transfer protocol (SMTP), Post Office Protocl3 (POP3), or the like, or a combination thereof. The wired connection may include but not limited to RS-232, CAN, TCP/IP, optical fiber, or the like, or a combination thereof.

The components of the smart detecting and feedback system that may be used in connection with the present system described above are not exhaustive and are not limiting. Numerous other changes, substitutions, variations, alterations, and modifications may be ascertained to one skilled in the art and it is intended that the present disclosure encompass all such changes, substitutions, variations, alterations, and modifications as falling within the scope of the present disclosure. In some embodiments, the processing device 104 may be integrated with the feedback module 105 as a single unit. These changes are still in the scope of the present disclosure.

Figure 2:
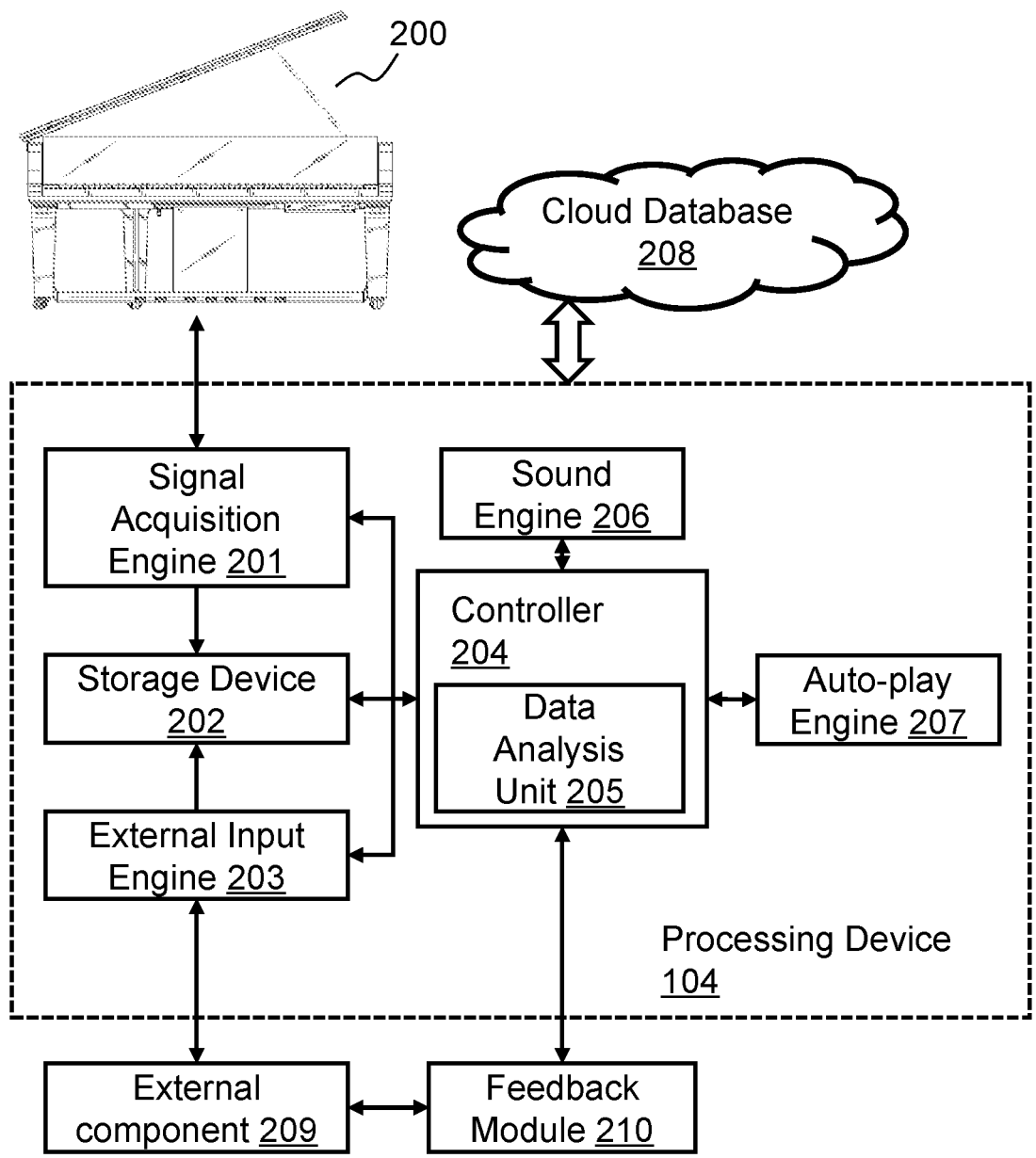
FIG. 2 is a block diagram illustrating an example of smart piano system according to some embodiments of the present disclosure.

FIG. 2 is a block diagram illustrating an example of smart piano system according to some embodiments of the present disclosure. As shown in FIG. 2, the smart piano system may include a piano 200, a processing device 104, a feedback module 210 and an external component 209. The processing device 104 may set up a connection with a cloud database 208. The processing device may further include a signal acquisition engine 201, a storage engine 202, an external 203, a controller 204, a sound engine 206, and an auto-play engine 207. The controller may further include a data analysis unit 205. More or less components may be included in processing device 104 without loss of generality. For example, two or more of the modules may be combined into a single module, or one of the module may be divided into two or more modules. In some embodiments, one or more of the modules may reside on different computing devices (e.g., desktops, laptops, mobile phones, tablet computers, wearable computing devices, etc.). In some embodiments, one or more portions of the processing device 104 may be integrated with the piano 200.

The piano 200 may be an acoustic piano, an electric piano, an electronic piano, a digital piano, and/or any other musical instrument with a keyboard. A non-exclusive list of an acoustic piano that may be used in connection with some embodiments of the present disclosure may include a grand piano, an upright piano, a square piano, a specialized piano (such as a toy piano, a prepared piano, etc.), etc.

The signal acquisition engine 201 may obtain information about a performance of a user (also referred to herein as "first performance data") according to one or more sensors integrated in the piano. The first performance data may include but is not limited to information about a plurality of keys of piano 200 that are pressed during a user performance, strength of pressing the keys, performance accuracy of a decorative note (e.g. appoggiatura, trill, mordent, turn), timing information associated with a plurality of key pressing (e.g. a time instant corresponding to a specific key or a time interval between two pressing of a specific key or keys), sequences of one or more operation of the keys, timing information about when a user steps on one or more pedals of the piano 200, or musical notes produced according to motions of the keys and/or the pedals of the piano 200. The first performance data may be acquired by one or more sensors integrated in the piano. The first performance data may be generated based on key signals and/or pedal signals acquired by the sensors. In some embodiments, the key signals and pedal signals may be an electric signal represented by a plurality of current value, a plurality of voltage value, or the like, or a combination thereof. When a user fingers on the keyboard of the piano and/or feet step on the pedals, the first performance data may be recorded. The first performance data may be stored in the storage device 202 or any other storage device. The first performance data may also be obtained without the user fingering on the keyboard. The user performance information (e.g., performance data of the user) may also be obtained by an external input engine 203 and it may be disclosed elsewhere in the present disclosure. In some embodiments, the signal acquisition engine 201 may also acquire some parameters set by a user. The parameters may include parameters indicating whether a special sign should be detected when a user plays a piece of music, parameters indicating whether a music note should be skipped if it was detected to be played in a wrong way for a number of times continuously (e.g., from 1 to 5 times, from 6 to 10 times), or the like, or a combination thereof.

The storage device 202 may include any device that is capable of storing data, such as data provided by the signal acquisition engine 201, the external input engine 203, the controller 204, or the like, or a combination thereof. Exemplary types of data that stored in the storage engine may include key signals and pedal signals acquired by the signal acquisition engine 201, the first performance data generated by the signal acquisition engine 201, second performance data generated by the external input engine (As used herein, the second performance data may refer to user postures, face expressions, emotions, or the like, or a combination thereof, that detected by a plurality of external components), and/or any other type of data that may be used to implement a smart piano system in accordance with various embodiments of the present disclosure. The storage device 202 may include one or more components. In some embodiments, the storage device 202 may include at least one of a hard drive, a solid-state drive, a removable storage drive (e.g., a flash memory disk drive, an optical disk drive, etc.), a digital video recorder, the like, or a combination thereof.

The external input engine 203 may be configured to connect the smart piano system to a plurality of external components 209. As used herein, the external components 209 may include a camera, a finger ring, gloves, or some other wearable things configured with sensors, or the like, or a combination thereof. In the external input engine 203, second performance data may be obtained and further transmitted into the storage device 202. The type of the second performance data may be determined according to the sensors configured in the corresponding external components 209 connected with the external input engine 203. For instance, if the external components 209 include a camera, the second performance data may include the pictures and/or videos associated with the hand posture when fingering the keys of the smart piano, the face expressions while playing the smart piano, the postures of the body, or the like, or a combination thereof. In some embodiments, the external components 209 may include a plurality of wearable devices configured with a plurality of sensor that may detect user performance data during playing the smart piano. For example, the external component 209 is a plurality of finger rings with at least one sensors. The finger ring may be wore in a knuckle of a finger, or any other position that may reflect the actual movement of the finger. When pressing the keys of the smart piano, the sensors in the finger ring may record its position information during the pressing, or accelerating information, or strength information, or the like, or a combination thereof. The recorded information may be transmitted into the external input engine 203 and further stored in the storage device 202. In some embodiments, the second performance data may be brain wave during playing the smart piano. For example, a helmet with brain wave detector may be wore by a user. The brain wave information may be transmitted into the external input engine 203 and for further analyzing.

The controller 204 may be configured to generate instructions for the smart piano system. For example, the controller 204 may generate instructions to instruct one or more components of the processing device 104 to perform various functions, such as generating signals, receiving data, processing data, storing data, transmitting data, presenting content (e.g., displaying video content and/images, playing audio content, etc.). The controller 204 may process data provided by the signal acquisition engine 201, the storage device 202, the external input engine 203 or any other component of the smart piano system.

The controller 204 may comprise processor-based and/or microprocessor-based units. Merely by way of example, the processor may include a microcontroller, a reduced instruction set computer (RISC), application specific integrated circuits (ASICs), an application-specific instruction-set processor (ASIP), a central processing unit (CPU), a graphics processing unit (GPU), a physics processing unit (PPU), a microcontroller unit, a digital signal processor (DSP), a field programmable gate array (FPGA), an acorn reduced instruction set computing (RISC) machine (ARM), any other circuit and/or processor capable of executing the functions described herein, the like, or any combination thereof.

The controller 204 may further include a data analysis unit 205. The data analysis unit 205 may be configured to analyze the first performance data and/or the second performance data, and some predetermined information data set as default and stored in the storage device. For example, the data analysis unit 205 may process the first performance data to determine which note is played and when the note is played. As another example, the hand posture information detected by an external component 209 and further transmitted into the external input engine 203 may be compared with a pre-stored hand posture information in the storage device 202. Details of the data analysis unit 205 may be disclosed elsewhere in the present disclosure, for example in the description of FIG. 3.

The sound engine 206 may include any device that is capable of generating audio content representative of acoustic sounds or electric sounds, such as one or more synthesizers, sequencers, audio codecs, signal processors, speakers, etc. The sound engine 206 may be configured to generate electric sounds and/or acoustic sounds. The acoustic sounds may be generated by acoustic parts of the piano 200, such as keys, pedals, hammers, strings, and/or any other portion of the piano 200 that can generate an acoustic sound.

In some embodiments, the sound engine 206 may generate audio content using one or more synthesizers, sequencers, audio codecs, digital processors, and/or any other device that can generate audio content representative of electric sounds. The audio content may be played back using one or more speakers or any other device to produce electric sounds. The sound engine 206 can make various changes to the electric sounds. For instance, the electric sounds may be replaced or changed based on the user's instructions.

The electric sounds may be played simultaneously with the acoustic sounds or be played without the acoustic sounds. The electric sounds may be also discontinuously played when the acoustic sounds are being played. For instance, in one performance, the electric sounds may be triggered when a user starts to produce one or more selected musical notes. The electric sounds may be removed once the one or more selected musical notes have been played.

In some embodiments, the sound engine 206 can produce sounds based on musical data provided by the external input engine 203, the storage device 202, and/or any other device. Merely by way of example, the smart piano system may fetch musical data from a personal computer or a smart phone of the user. Then, the musical data may be converted into a form that is recognizable by the sound engine 206 and the sound engine 206 accordingly.

The auto-play engine 207 may be configured to automatically present musical data. The musical data may be obtained from the storage device 202, and/or any other device. Merely by way of example, the musical data may be generated according to a performance of the user, and stored in the storage device 202. Exemplary musical data may include musical manuscript, one or more musical notes, timing of fingering one or more keys, timing of operating one or more pedals, sequences of fingering one or more keys, and sequences of operating one or more pedals, etc. The auto-play engine 207 may generate sounds and/or images based on the musical data. Merely by way of example, after musical notes are played by the user and stored as musical data in the storage device 202 by the smart piano system, the auto-play engine 207 may automatically acquire the musical data. The musical notes may then be generated with or without modifications. The auto-play engine 207 may also provide the sound engine 206 with the musical data and instructions for generating sounds. Then the sound engine 206 may generate sounds accordingly.

The feedback module 210 may be configured to act as a connector between the controller 205 and the external component 209. The controller 205 may generate user readable information signal and transmit into the feedback module 210. As used herein, the user readable information signal may include signal of sound, image, vibration, electricity pulse, or the like, or a combination thereof. The type of the user readable information signal may be determined based on the type external component 209. For example, the plurality of the external components 209 may include one or more cameras and one or more displays. The image of the hand posture or the other posture information of the user may be detected by the one or more cameras. The image data may be than transmitted and processed in the processing device 104. After the processing, the feedback module 210 may receive a signal relating to the image detected before, and further transfer the signal to the one or more displays. In some embodiments, the plurality of the external components 209 may include one or more finger rings with sensor and vibration device. The one or more sensors configured with the finger rings may detect the hand posture during playing. Then a signal relating to the hand posture may be recorded and further transmitted and processed by the processing device 104. After the processing, the feedback module 210 may receive a vibration signal relating to the hand posture signal detected before and transmitted to the vibration device. The vibration device may then vibrate according to the vibration signal.

The processing device 104 may be connected to a cloud database 208 according to some embodiments of the present disclosure. The storage device 202 may download and/or upload data with the cloud database 208. The data downloaded by the storage device 202 may include but is not limited to historical records of past performance of a user, records of performance of other users, or the like. In some embodiments, if the storage device 202 receive a data from the signal acquisition engine 201, or the external input engine 203, or the controller 204, it may send a copy version of the data to the cloud database 208 as a backup. In some embodiments, the sound engine 206 may receive information from cloud database 208. For example, if a user order a musical note that not stored in the storage device 202, the sound engine may generate sound signal according to the musical note in the cloud database 208. The controller 204 may receive information from the cloud database 208. In some embodiments, if a new type of external component is configured to the smart piano system, the controller 204 may generate control instructions by downloading related instructions from the cloud database 208. As used herein, the new type of external component 209 refer to a component that corresponding control instructions to it may not be stored or generated by the processing device 104. In some embodiments, the auto-play engine 207 may download auto-play information from the cloud database 208. The auto-play information may include timing of pressing the keys of the smart piano, the sequence of pressing the keys, the strength of pressing the keys, the time interval of pressing the keys, or the like, or a combination thereof.

In some embodiments, each of the signal acquisition engine 201, the storage device 202, the external input engine 203, the sound engine 206, the controller 204, and the auto-play engine 207 may include and/or be any of a general purpose device such as a computer or a special purpose device such as a client, a server, and/or any other suitable device. Any of these general or special purpose devices may include any suitable components such as a hardware processor (which may be a microprocessor, digital signal processor, a controller, and/or any other suitable hardware processor), memory, communication interfaces, display controllers, input devices, and/or any other suitable components. For example, each of the signal acquisition engine 201, the storage device 202, the external input engine 203, the sound engine 206, the controller 204, and the auto-play engine 207 may be implemented as or include a personal computer, a tablet computer, a wearable computer, a multimedia terminal, a mobile telephone, a gaming device, a set-top box, a television, and/or any other suitable device. Moreover, each of the signal acquisition engine 201, the storage device 202, the external input engine 203, the sound engine 206, the controller 204, and the auto-play engine 207 may comprise a storage device, which may include a hard drive, a solid state storage device, a removable storage device, and/or any other suitable storage device. Each of the signal acquisition engine 201, the storage device 202, the external input engine 203, the sound engine 206, the controller 204, and the auto-play engine 207 may be located at any suitable location. Each of the signal acquisition engine 201, the storage device 202, the external input engine 203, the sound engine 206, the controller 204, and the auto-play engine 207 may be implemented as a stand-alone device or integrated with one or more other components of processing device 104.

The components of the smart piano system that may be used in connection with the present system described above are not exhaustive and are not limiting. Numerous other changes, substitutions, variations, alterations, and modifications may be ascertained to one skilled in the art and it is intended that the present disclosure encompass all such changes, substitutions, variations, alterations, and modifications as falling within the scope of the present disclosure.

Figure 3:
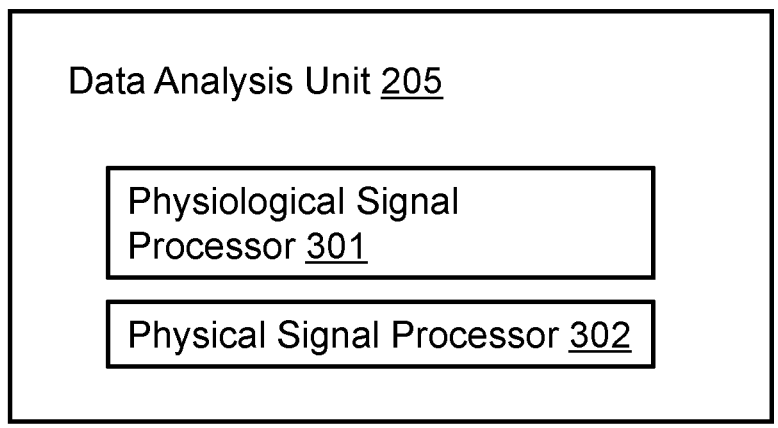
FIG. 3 is a block diagram illustrating an example data analysis unit 205 of the processing device 104 in accordance with some embodiments of the present disclosure.

FIG. 3 illustrates an example data analysis unit 205 of the processing device 104 in accordance with some embodiments of the present disclosure. The data analysis unit 205 may include but is not limited to a physiological signal processor 301, a physical signal processor 302. The data analysis unit 205 may process, analysis, calculate, retrieval, store, and transmit data. In some embodiments, the data analysis unit 205 may also include a storage device. The physiological signal processor 301, the physical signal processor 302 may be connected or communicate with the signal acquisition engine 201, the storage device 202, the external input engine 203, the controller 204, the sound engine 206, the auto-play engine 207, the feedback module 105 via a wireless connection or a wired connection.

The physiological signal processor 301 may be configured to process, analysis, calculate, retrieval, store, transmit physiological information such as user emotion, attitude, or the like, or any physiological information which relate to user performance. In some embodiments, the physiological information may also include rain wave, heart rate, microexpression, blood pressure, pulse, or the like, or a combination thereof, which may be used to assess a user psychological state related to user performance.

The physical signal processor 302 may be configured to process, analysis, calculate, retrieval, store, and transmit physical information such as playing speed, key pressure, user position, gesture, sound or the like, or a combination.

The physiological signal processor 301 and the physical signal processor 302 may be any commercially available or custom enterprise, application, personal, pervasive and/or embedded microprocessor, microcontroller, digital signal processor or the like. The physiological signal processor 301 and the physical signal processor 302 may be local or remote.

The components of the data analysis unit 205 may be used in connection with the present system described above are not exhaustive and are not limiting. Numerous other changes, substitutions, variations, alterations, and modifications may be ascertained to one skilled in the art and it is intended that the present disclosure encompass all such changes, substitutions, variations, alterations, and modifications as falling within the scope of the present disclosure. In some embodiments, the data analysis unit 205 may be configured in the detecting device 102. In some embodiments, the physiological signal processor 301 and the physical signal processor 302 may be integrated into a single unit. These changes are still in the scope of the present disclosure.

Figure 4:
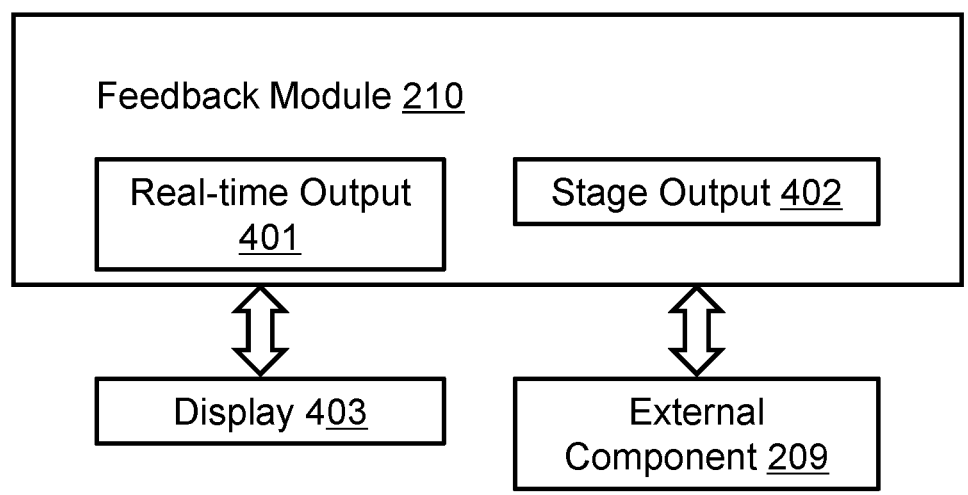
FIG. 4 is a block diagram illustrating an example feedback module of a smart detecting and processing system in accordance with some embodiments of the present disclosure.

FIG. 4 illustrates an example feedback module of a smart detecting and processing system in accordance with some embodiments of the present disclosure. A feedback module 105 may include but is not limited to a real-time output 401, a stage output 402, and a display 403. In some embodiments, the feedback module 105 may also include a storage device. The different units of real-time output 401, stage output 402, and display 403 may be connected or communicate with each other via a wireless connection or a wired connection.

The real-time output 401 may be configured to output a real-time or substantially real-time feedback content to the display 403 and/or an external component 209.

The real-time feedback content may include any information when user play a piece of music, for example, music score, performance video, error notes reminder, emotion, fingering, posture, or the like, a combination thereof. For example, the feedback content may be of a visual form displayed on a screen, such as textual description of the feedback, a score, or graphical information (e.g., a progress bar), showing how accurate the user's performance compared to a reference musical performance. The visual feedback content may reflect accuracy of the user's performance within a predetermined period of time, or an overall accuracy since the beginning of the performance. The feedback content may also be tactual. For example, through a wearable device, such as finger rings, the real-time output 401 may control may input an electric shock or vibration to the user's particular finger or location of the user's hand to inform and/or remind the user when a difference between a musical note or rhyme corresponding to that finger or hand is greater than a threshold value. In some embodiments, the real-time output 401 may be configured to output electric shock, vibration to the external component 209 to remind user error via the external component 209.

The stage output 402 may be configured to output a stage feedback content to the display 403 and an external component 209.

The stage feedback content may be a stage summary after a period time. The stage summary may include information about user for a period of learning experience, such as learning style, learning receptivity, learning rate, accustomed error, suggestion, evaluation, skill level, user psychological state, or any information related to user performance. In some embodiments, the period time may be a period time of finishing a predetermined length of a music score, a period time of finishing a course, one week, one month, or the like.

In some embodiments, the stage output 402 may be configured to output personalize education plan to user according to user performance.

In some embodiments, the real-time output 401 and the stage output 402 may output the feedback content to the database 102, the cloud database 208, or other storage devices, which may store information.

The display 403 may be configured to present feedback content to the user.

The display 403 may be a device which may present feedback content to user. The display 403 may include but is not limited to a printing device, a plotter, an image output system, a speech output system, a magnetic recording apparatus, or the like, or a combination thereof.

In some embodiments, the display 403 may be an intelligent terminal for example, a desktop computer, a laptop, a smart phone, a tablet computer, a personal digital assistant (PDA), or the like, or any device which may receive feedback content. In some embodiments, the display 403 may be a multimedia display which may display audio, image, text or the like, or a combination thereof.

In some embodiments, the display 403 may perform the functions of the detecting module 102 such as a microphone may be used as a music output device, or a music input.

The components of the feedback module 105 may be used in connection with the present system described above are not exhaustive and are not limiting. Numerous other changes, substitutions, variations, alterations, and modifications may be ascertained to one skilled in the art and it is intended that the present disclosure encompass all such changes, substitutions, variations, alterations, and modifications as falling within the scope of the present disclosure. In some embodiments, the real-time output 401 may be integrated with the stage output 402 as a single unit. In some embodiments, the feedback may be configured with a processor to process information for outputting. In some embodiments, the real-time output 401 and the stage output 402 may be controlled by the controller 204. These changes are still in the scope of the present disclosure.

Figure 5A:
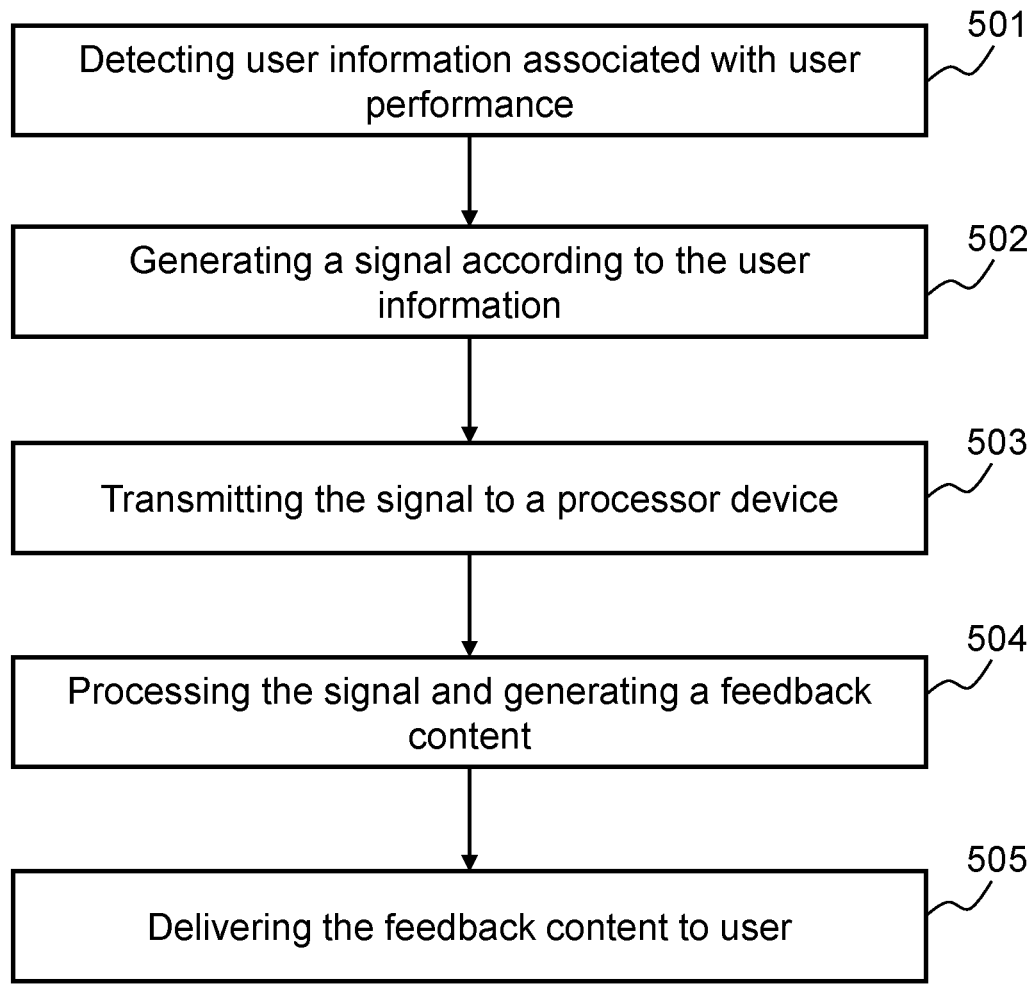
FIG. 5A is a flowchart illustrating a method for delivering a feedback content to the user of the smart piano.

FIG. 5A is flowchart illustrating a method of delivering a feedback content to the user of the smart piano system as introduced in FIGS. 1-4. The method may be performed by the smart piano system as introduced in FIGS. 1-4. For example, the method may be implemented as a set of instructions stored in a non-transitory storage medium of the smart piano system. When the processing device 104 of the smart piano system 100 execute the set of instructions, the set of instructions may direct the processing device 104 to perform the following steps of the process.

In step 501, the smart piano system may detect and/or obtain user information associated with user performance.

The user information may include the first performance data and the second performance data as introduced in FIGS. 1-4, or the like, or a combination thereof.

If the user information is detected and/or obtained by a sensor installed in the smart piano 200 and transmitted into the signal acquisition engine 201, the user information may be categorized as the first performance data. If the user information is detected and/or obtained by a sensor installed in the external component 209, the user information may be categorized as the second performance data.

In some embodiments, the user information may include the identity of the user. For example, the user may be required to type in the ID number and/or the password via an input device (e.g., a key board, a remote controller, a touch panel, or the like, or a combination thereof). The performance data may refer to user postures, hand postures, face expressions, emotions, pattern of brain wave, or the like, or a combination thereof. The user information associated with user performance may be used to assess the performance of the user. For instance, if the hand posture of a user during a playing is similar to a hand posture file recorded in the storage device 202, the performance of the user may be considered as well. For another example, if the face expressions of the user keep concentrate during a playing, the user may be considered to enjoy the performance. In some embodiments, the detecting may be performed simultaneously with the user performance. Some of the user information (e.g. the hand posture of the user) may need to be monitored in real time. The assessment according to this kind of user information may need intact data during the performance. In some embodiments, the detecting may be performed at preset intervals. Some kind of the user information may not need to be monitored all the time. Such kind of user information may include face expression, brain wave, body shape, or the like, or a combination thereof. This kind of user information may be detected every several time intervals (e.g., every second). The time interval may be predetermined by the user, or set as default.

According to exemplary embodiments of the present disclosure, the user information may also include a plurality of historical feedback from past performances of the user.

In step 502, the smart piano system may generate a signal according to the user information.

The type of the signal may include a current value, a voltage value, or the like, or a combination thereof. The signal may be generated by the external component 209 configured with a plurality of sensors. The intensity of the signal may be determined according to the kind of the corresponding sensor configured in the external component 209. For example, if the external component 209 is a finger ring with one or more sensors record the position information of the corresponding finger, the intensity of the signal may increase if the corresponding finger pressing the key. In some embodiments, the external component 209 is a camera, the intensity of the signal may not be changed since the camera may monitoring the fingers all the time. The external component 209 may also be a helmet with brain wave sensors. When the user is playing a music on the piano, the brain wave sensors are configured to sense, detect, and collect brain wave of the user. Accordingly, the second performance data may also include brain wave information of the user when operating the piano.

In step 503, the signal may be transmitted to a processing device 104.

As shown FIG. 2, the signal may be generated by the external component 209 and further transmitted to the external input engine 203 of the processing device 104. The transmission of the signal from a plurality of external components 209 to the external input engine 203 may be through wired transmission or wireless transmission. Exemplary wired transmission may include RS-232, CAN, TCP/IP, optical fiber, or the like, or a combination thereof. Exemplary wireless transmission may include Bluetooth, WLAN, Wi-Fi, Zigbee, Z-Wave, EnOcean, infra-red data association (IrDA), Ultra Wideband (UWB), Near Field Communication Services (NFC), mobile networks (2G, 3G or 4G signal), VPN, shared network, or the like, or a combination thereof. In some embodiments, the transmission may be executed in real time during the performance. For example, a sequence of continuous image data may be generated by a camera, and a flux of image data may need to be transmitted to the processing device 104 in real time. In some embodiments, the transmission may not need to be executed in real time during the performance. For example, a plurality of position data may be recorded in a storage device of a finger ring. After the performance or a specific time interval, the position data may be transmitted to the processing device 104 in a specific sequence according to the timing it be recorded.

In step 504, the smart piano system may process the signal and generate a feedback content accordingly.

As is shown in FIG. 2, the signal may be received by the external input engine 203 and/or the signal acquisition engine 201, stored in the storage device 202 and further transmitted to the controller 204. In some embodiments, the signal may not need to be stored in the storage device, but transmitted to the controller 204 directly. The signal may be analyzed by the data analysis unit 205. After the processing, a feedback content may be generated by the controller 204. A plurality of instructions may be generated according to the feedback content by the feedback module 210. The processing method may be determined according to the type of the performance data detected before. Merely by way of example, the external components 209 may include a camera. The first performance data detected by the camera may be a sequence of images reflecting the changing of the user's hand posture during playing. The sequence of images may be jointed together by the controller 204 to generate a video content. In some embodiments, the external components may include a position sensor. The first performance data detected by the sensor may be the timing and position of a finger. The processing method may be to analyze the timing and position data of the finger to generate a virtual hand similar to the users during playing. The feedback content may refer to some actions that may remind to user. Exemplary feedback content may include displaying images and/or videos on a display, driving a vibration device, driving an electricity pulse generator, or the like, or a combination thereof. The type of the feedback content may be determined by a plurality of reminder devices included in the external components 209. As used herein, the plurality of reminder devices may refer to devices that may generate human sensible signals. Exemplary reminder devices may include display, vibration device, electricity pulse generator, or the like, or a combination thereof. For example, the feedback content may be of a visual form displayed on a screen, such as textual description of the feedback, a score, or graphical information (e.g., a progress bar), showing how accurate the user's performance compared to a reference musical performance. The reference musical performance may include but is not limited to a standard musical performance generated automatically by the processing device 104 based on the music score, musical performance of a teacher, an expert, or the like. The visual feedback content may reflect accuracy of the user's performance within a predetermined period of time, or an overall accuracy since the beginning of the performance. The feedback content may also be tactual. For example, through a wearable device, such as finger rings, the real-time output 401 may control an electric shock or vibration to the user's particular finger or location of the user's hand to inform and/or remind the user when a difference between a musical note or rhyme corresponding to that finger or hand is greater than a threshold value.

According to embodiments of the present disclosure, the smart piano system may also process the plurality of historic feedback from past performances of the user. To this end, the data analyze unit may analyze the user's past performance based on the plurality of historical feedback and generate a statistic result of the user performance. The result may reflect characteristics of the user in his/her performance. For example, the data analysis unit may generate a statistic result showing what note or a combination of notes that the user failed to perform correctly in the past. This result then may be delivered to the user to show him/her where is his/her weak point during the performance and highlight the improvements he/she would make. For example, the characteristics of the user performance may include a user performance on the note or combination of notes that has a probability of mismatch to a reference performance greater than a predetermined probability. According to another embodiment, the statistic result may also reflect changes of the characteristics of the user's performance over time. For example, the statistic result may show improvement of the user's performance in the above note or combination of notes over time, so that when the result is delivered to the user, the user may be informed about his/her performance improvement. In some embodiments, the result may take in the form of a textual report.

In step 505, the smart piano system may deliver the feedback content to the user.

In some embodiments, the plurality of instructions generated by the feedback module 210 before may then be transmitted to the plurality of external components 209 to drive corresponding reminder devices in the external components 209. The transmission of the instruction from the feedback module 210 to the external components 209 may through wired transmission or wireless transmission.

Upon receiving the instructions, the corresponding reminder device in the external components may generate human sensible signals. For example, the instruction may be a sequence of image data that may drive a display to show images on it. The instructions may be a pulse signal to drive a vibration device and/or an electricity pulse generator. If the user pressing a wrong key or the hand posture is not correct, the vibration device may vibrate and/or the electricity pulse generator may generate an electricity pulse to remind the user.

According to embodiments, the reminder device may include an augment reality device, such as a headset configured to display a virtual teacher teaching the user according to the feedback. When the user made an incorrect performance, such as a user performance that does not match a reference performance, the virtual reality teacher may remind and/or correct the performance to the user.

It should be noted that the above description of the method of delivering a feedback content to the user of the smart piano is merely provided for the purpose of illustration, and not intended to limit the scope of the present disclosure. For person having ordinary skill in the art, multiple variations and modifications may be made under the teachings of the present disclosure. For example, the detecting method and/or feedback content may be changed according to specific implementation scenarios. Merely by way of example, some other external components may be included and the corresponding detecting and/or feedback content may be changed correspondingly. In some embodiments, the feedback content may not be generated after processing the signal generated before, by the processing device. It may be generated directly upon detecting the user performance associated with user performance.

Figure 5B:
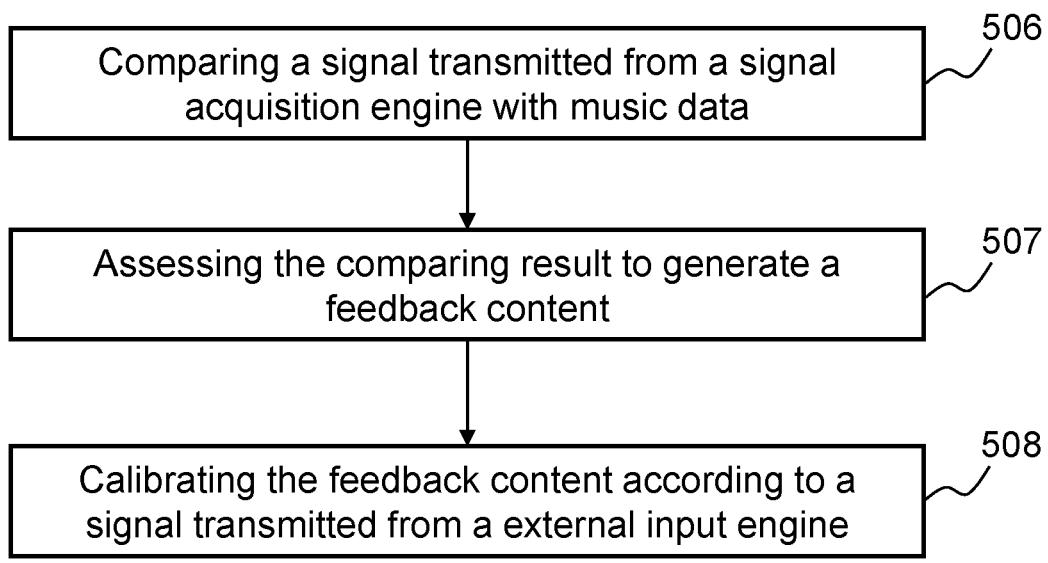
FIG. 5B is a flowchart illustrating a method for processing signal and generating a feedback content according to some embodiments of the present disclosure.

FIG. 5B is a flowchart illustrating a method of processing the signal from the external input engine 203 and/or the signal acquisition engine 201 and generating a feedback content according to some embodiments of the present disclosure. As mentioned before, the signal acquisition engine 201 may receive signals ("the first signal") carrying the first performance data from the piano 200. The external input engine 203 may receive signals ("the second signal") carrying the second performance data from the external component 209. The controller 204 may receive the first and/or second signals from the signal acquisition engine 201 and/or the external input engine 203. The feedback content may be generated based on one of the first signal and the second signal. In some embodiments, the feedback content may be generated based on both of the first signal and the second signal.

In step 506, the controller 204 may obtain a first comparing result by comparing the first signal transmitted from the signal acquisition engine 201 with music data.

The first signal transmitted from the signal acquisition engine 201 may include piano related information, for example, a key identity information, a timing information and strength information of key pressing, a sequence information of a plurality of key pressing, a timing information and strength information of pedal stepping on, musical note information produced by key and/or pedal motion, or musical rhythm information produced by key and/or pedal motions, or the like, or a combination thereof. The music data may be a standard data pre-stored in the storage device 202 and the same type as the signal transmitted from the signal acquisition engine 201. In some embodiments, the first signal transmitted from the signal acquisition engine 201 may contain a timing information of a key pressing by the user. The corresponding music data may contain a standard timing information of the key. The timing information may be compared in this step.

In step 507, the controller 204 may access the first comparing result to generate the feedback content.

For example, if the timing information mentioned before that contained in the signal transmitted from the signal acquisition engine 201 matches or substantially matches the standard timing information, the comparing result may be considered as correct (e.g., similarity between the timing information of the first performance data and that of the pre-stored standard timing information is smaller than a threshold value). If the timing information mismatches the standard timing information, the comparing result may be considered as incorrect. Feedback content may be generated based on the comparing result. For example, if the comparing result is correct, no reminders may be sent to the user, or a correct playing symbol may be displayed on a screen. If the comparing result is incorrect, reminder information may be generated and sent to user via some reminder device. In some embodiments, the feedback content may include a real-time reminder or a substantially real-time reminder indicating whether an error happens, or a report showing. The feedback content may be in the form of audio content, video content, images, text, graphics, electric shock, vibration, or the like, or a combination thereof.

In step 508, the controller 204 may calibrate the feedback content generated before according to the second signal transmitted from the external input engine 203. In some embodiments, the timing information contained in the signal transmitted from the signal acquisition engine 201 may not exactly represent the timing of a key pressing because of some delay of mechanical motion of the key or because of processing delay of the signal acquisition engine 201. So the feedback content may need to be calibrated. In some embodiments, a camera may be used to detect the key pressing during playing. Another timing information of key pressing may be recorded by the camera and further transmitted to the controller 204 via the external input engine 203. The timing information transmitted from the external input engine 203 may be compared with the timing information transmitted from the signal acquisition engine 201 and the standard timing information. The controller 204 may obtain and/or generate a second comparing result according to the comparison. The feedback content may be calibrated according to the second comparing result. Merely by way of example, an average value of timing information may be calculated based on the timing information transmitted from the external input engine 203 and the timing information transmitted from the signal acquisition engine 201. The average value of timing information may be then compared with the standard timing information to assess whether the key pressing motion is correct.

It should be noted that the processes described above is provided for the purposes of illustration, and not intended to limit the scope of the present disclosure. Apparently for persons having ordinary skills in the art, numerous variations and modifications may be conducted under the teaching of the present disclosure. However, those variations and modifications may not depart the protecting scope of the present disclosure. In some embodiments, the comparing may be performed firstly between the signal transmitted from the external input engine 203 and the standard timing information. And the signal transmitted from the signal acquisition engine 201 may be used to calibrate the feedback content. These are still in the protecting scope of present disclosure.

Figure 6:
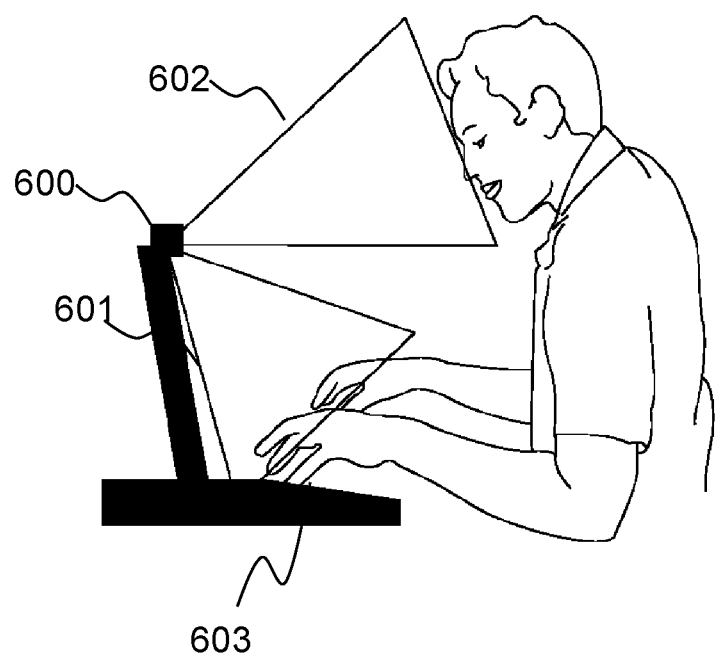
FIG. 6 is a diagram illustrating an embodiment of the present disclosure.

FIG. 6 is an embodiment of the present disclosure. As is shown in the figure, a user is playing a smart piano 603.

The smart piano 603 include at least a display 601 and a camera 600. To the smart piano system, the display 601 and the camera 600 may be the external components 209. The display 601 may be set vertically relative to the keyboard of the smart piano 603. In some embodiments, the display may be turned to a specific angle relative to the vertical position described before to face to the user in an appropriate position. The specific angle may depend on the user's height and/or sitting posture. For example, a taller user may turn the display to a larger angle with respect to the smart piano 603 in order for the display to face towards the user, whereas a shorter user may turn the display to a smaller angle with respect to the user in order for the display to face towards the user. At least one camera 600 may be installed on the smart piano 603. The position of the camera 600 may be set at the top and middle of the display 604. In this case, the camera 600 may overlook the keyboard and/or the hand posture of the user. In some embodiments, the position of the camera 600 may be set at one side of the display 600 or one side of the smart piano. In this case, the camera 600 may capture a side view of the keyboard and/or the hand posture of the user. The view angle of the camera 600 may be adjusted according to the demand of the user. For example, as is shown in the figure, the camera 600 may be pivotable to different directions. By pivoting the camera 600, a first view angle 601 and a second view angle 602 may be acquired. The first view angle 601 may monitor the keyboard and the hand posture of the user. The second view angle 602 may monitor the face expressions of the user. The direction of the camera may depend on user demand. For example, when the user wants to record the hand posture during playing, the view angle may be adjusted to the first view angle 601. When the user wants to record the face expressions during playing, the view angle may be adjusted to the second view angle 602. In some embodiments, the cameras 600 installed on the smart piano 603 may be more than one. One of the cameras 600 may be set in a first position with the first view angle 601. Another one of the cameras 600 may be set in a second position with the second view angle 602. The plurality of cameras 600 may be operated simultaneously to record the hand posture and/or the face expressions of the user, or separately according instructions from a processing device 104.

In this embodiment, the external components 209 may include at least one display 604 and at least one camera 600. The user information associated with user performance may be detected by the camera 600. The user information may include hand posture, face expression, body posture, or the like, or a combination thereof. The signal generated according to the user information may be a plurality of image data, and/or a video data. The image and/or video data may then be transmitted to a processing device 104 of the smart piano. The image and/or video data may than be processed in the processing device 104. The processing may include image and/or video reconstruction, image and/or video cutting, or the like, or a combination thereof. The processing device 104 may then generate a feedback content according to the processed image and/or video data. The feedback content may be a plurality of processed images and/or videos to be displayed on the display 604 of the smart piano 603. Upon receiving the feedback content, the display may show the plurality of processed images and/or videos to the user.

Figure 7A:
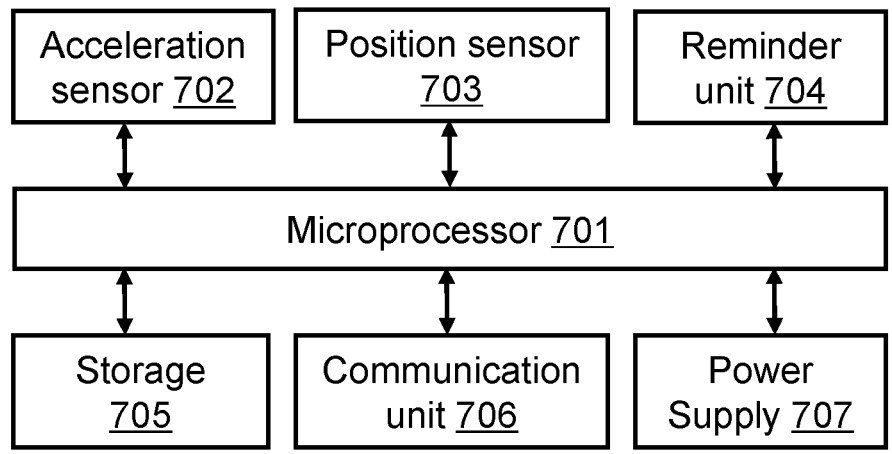
FIG. 7A and FIG. 7B are diagrams illustrating an embodiment of the present disclosure.
Figure 7B:
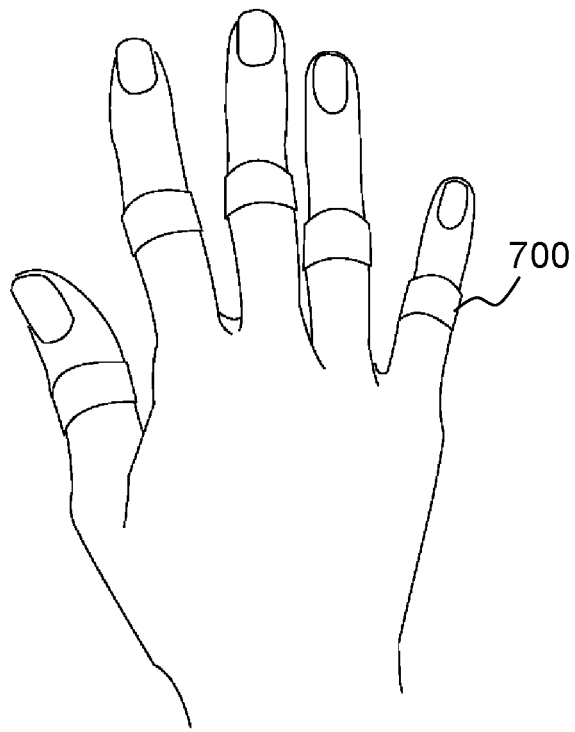

FIG. 7A and FIG. 7B disclose an embodiment external component 209 of the present disclosure.

According to the embodiment, the external component 209 may be a plurality of finger rings 700. Each finger ring may include one or more sensors and/or reminder devices to measure movements and positions of the finger ring. Each finger ring of the plurality of finger rings 700 may be worn on a knuckle of the user. The position and movement information of each the knuckles may be recorded by the finger rings 700 and further used to reconstruct the hand posture of the user. In some embodiments, the finger rings 700 may be worn on the fingertips of the user's hand. A sensor installed in the ring may detect the pressing speed of the key and further calculate the pressing strength on the corresponding key.

FIG. 7A is a block diagram illustrating the devices in the finger ring 700 according to some embodiments of the present disclosure. The finger ring 700 may include a microprocessor 701, an acceleration sensor 702, a position sensor 703, a reminder unit 704, a storage 705, a communication unit 706 and a power supply 707.

The microprocessor 701 may be connected with the other devices via a data bus, or the like, or a combination thereof. Merely by way of example, the processor may include a microcontroller, a reduced instruction set computer (RISC), application specific integrated circuits (ASICs), an application-specific instruction-set processor (ASIP), a central processing unit (CPU), a graphics processing unit (GPU), a physics processing unit (PPU), a microcontroller unit, a digital signal processor (DSP), a field programmable gate array (FPGA), an acorn reduced instruction set computing (RISC) machine (ARM), any other circuit and/or processor capable of executing the functions described herein, the like, or any combination thereof.

The Acceleration sensor 702 may include gyroscope, Hall sensor, magnetic field sensor, or the like or a combination thereof. The acceleration data of the finger ring may represent the movement of the corresponding finger. It may be further used to calculate of pressing strength of the finger.

The position sensor 703 may include electro-optical sensor, or the like, or a combination thereof. The position sensor may record the position of the finger ring at a specific timing. The position of the finger ring may be an absolute position relative to the ground or the smart piano, or may be a relative position relative to another finger ring.

The reminder unit 704 may include the reminder device described before, for example, a display, a vibration device, an electricity pulse generator, a LED, a speaker, or the like or a combination thereof. The reminder unit 704 may be driven by instruction from the microprocessor 701.

The storage 705 may include any device that is capable of storing data. The user performance data detected by the sensors may be stored in the storage 705 temporarily and then transmitted to the microprocessor. The instructions generated by the microprocessor 701 may be stored in the storage 705 temporarily and then transmitted to the reminder unit 704.

The communication unit 706 may be configured to set up a transmission channel between the finger ring 700 and the smart piano. The transmission may through wired transmission or wireless transmission.

The power supply 707 may be configured to supply electricity power to the other devices in the finger ring 700.

In some embodiments, an acceleration data and/or a position data may be detected by the acceleration sensor 702 and/or the position sensor 703. The acceleration data and the position data may refer to the user information associated with user performance. Then the data may be processed in the microprocessor 701 to generate a signal. The signal may be then transmitted to the communication unit 706 for further transmission to the processing device 104 of a smart piano. The communication unit 706 may set up a communication channel with the external input engine 203 of the processing device 104, and the signal may be transmitted then. The communication unit 706 may then receive an instruction from the feedback module 210 of the smart piano after the signal transmitted before been processed. The instruction may be transmitted to the reminder unit 704 directly, or through the microprocessor 701. The instruction may drive the corresponding reminder devices in the reminder unit 704.

Figure 8:
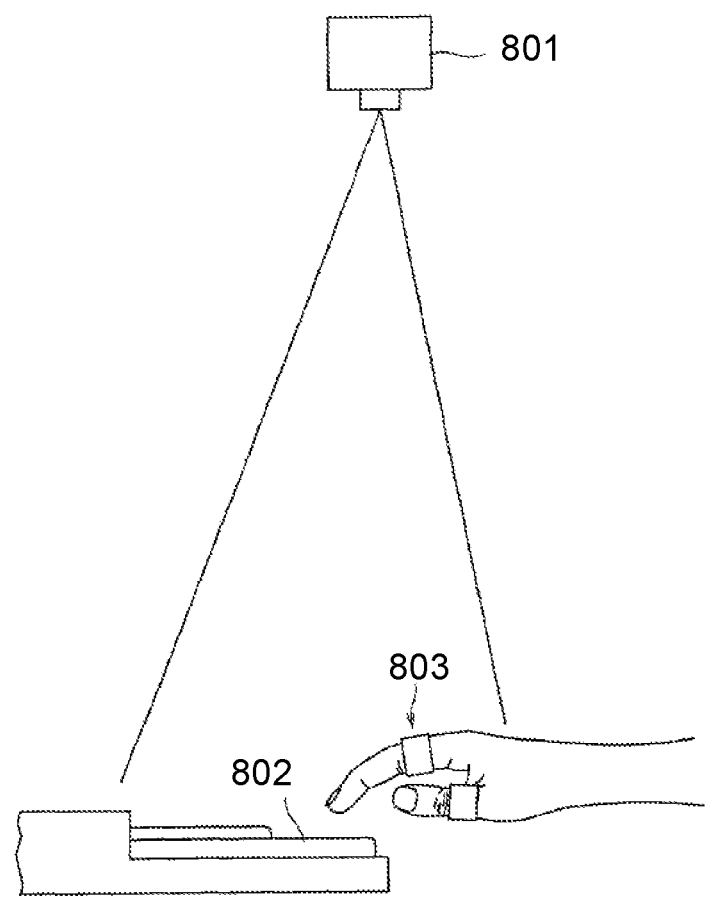
FIG. 8 is a diagram illustrating an example of detecting user information associated to user performance according to some embodiments of the present disclosure.

FIG. 8 is an example of detecting user information associated to user performance according to some embodiments of the present disclosure. The external components 209 may include a camera 801 and a plurality of finger ring 803. The camera may be set on the top of the smart piano, or somewhere that may monitoring the keyboard 802 and the hand of the user simultaneously. The finger ring 803 may include some or all of the devices in the finger ring 700. The finger ring 803 may exhibit characteristic that may be detected by the camera 801. Exemplary characteristic may include color, shape, size, or the like, or a combination thereof. In some embodiments, the finger rings 803 worn on different fingers may be coated with different color. The camera 801 may detect the different colors of the finger rings 803. When the user pressing the key board 802, the movement of the color finger rings 803 may represent the movement of corresponding fingers. The movement data may be recorded by the camera 801 and further transmitted to the processing device 104 of the smart piano.

Figure 9A:
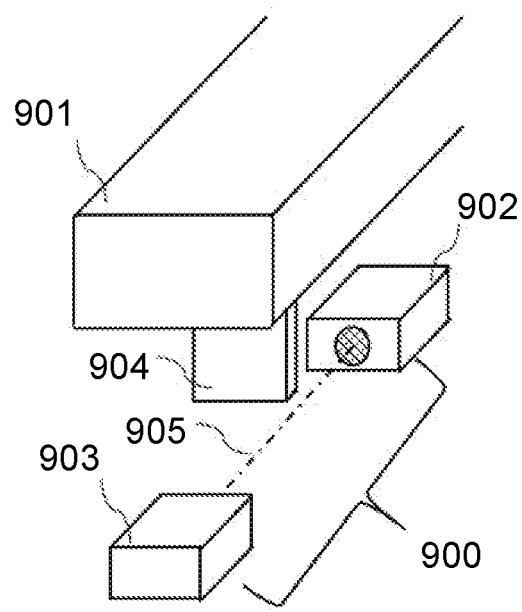
FIG. 9A and FIG. 9B are diagrams illustrating two examples of detecting user information associated to user performance according to some embodiments of the present disclosure.
Figure 9B:
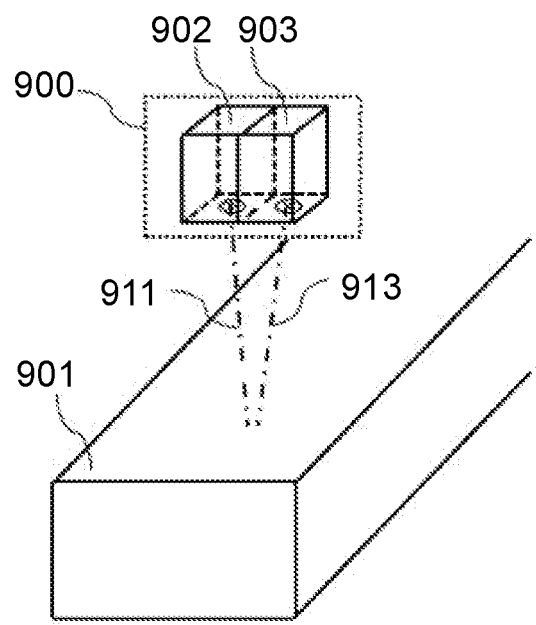

FIG. 9A and FIG. 9B are two examples of detecting user information associated to user performance according to some embodiments of the present disclosure. The two figures may illustrate mechanisms for detecting motions of a key of a piano using a sensor. The sensor may be integrated in the smart piano to detect piano related information. As shown, it may include a sensor 900. The sensor 900 (e.g., an opto-electric sensor) may include a light-emitting element 902 and a light-detecting element 903. An exemplary list of the light-emitting element 902 may include visible LED, laser LED, infrared LED, laser diode (LD), photocell, etc. An exemplary list of the light-detecting element 903 may include phototube, active-pixel sensor (APS), bolometer, charge-coupled device (CCD), gaseous ionization detector, photo-resistor, phototransistor, etc. The light-emitting element 902 may generate light of various wavelengths. For example, the light-emitting element 902 may generate visible light, infrared light, ultraviolet (UV) light, etc. In some embodiments, the wavelength of a beam of light emitted by the light-emitting element 902 may be controlled by one or more motors using a Pulse Width Modulation (PWM) mechanism. The light-detecting element 903 may be configured to receive the light and to convert it into an electronic signal (e.g., a current signal, a voltage signal, etc.).

Referring to FIG. 9A, in some embodiments, the light-emitting element 902 and the light-detecting element 903 may be positioned under the key 901. In some embodiments, a non-transparent extrusion, e.g., a plate 904, may be mounted to a surface of the key 901. The non-transparent plate 904 may partially or completely prevent the light-detecting element 903 from receiving the light emitted by the light-emitting element 902. The non-transparent plate 904 may be mounted to a lower surface of the key 901 (e.g., the bottom of the key 901). The light-emitting element 902 may constantly emit light towards the light-detecting element 903. The light-emitting element 902 may also discontinuously emit light towards the light-detecting element 903. For instance, there may be one or more time intervals between light emissions. The one or more time intervals may be based on velocity of the user depressing the keys.

In some embodiments, a light beam 905 may be emitted by the light-emitting element 902. When the key 901 is not pressed down, the key stays at a "top" position. When a user presses the key 901, the key may move downwards from the "top" position. When the key 901 does not go further, it reaches an "end" position. The non-transparent plate 904 may move along with the key 901 and may block one or more portions of the light beam 905. The amount of the light detected by the light-detecting element 903 may vary due to the movement of the non-transparent plate 904. For example, when the key 901 moves toward the "end" position, the amount of light detected by the light-detecting element 903 may decrease. As another example, when the key 901 moves toward the "top" position, the amount of light detected by the light-detecting element 903 may increase. The light-detecting element 903 can determine information about the amount of the received light over time and can convert such information into one or more electronic signals (e.g., one or more key signals).

Turning to FIG. 9B, in some embodiments, the non-transparent plate 904 may be omitted from the smart piano system. For instance, the light-emitting element 902 and the light-detecting element 903 may be placed above or beneath the key 901, and the light beam 911 emitted by the light-emitting element 902 may not be able to travel linearly towards the light-detecting element 903. A light beam 911 emitted by the light-emitting element 902 may be projected towards the key 901. The light beam 911 may be reflected by the key 901 once it reaches a surface of the key 901 (e.g., the upper surface, the bottom surface, etc.). The reflected light 913 may then travel towards the light-detecting element 903 and may be received by the light-detecting element 903. When a user presses the key 901, the key may move downwards from the "top" position to the "end" position. The distance that the light travels from the light-emitting element 902 to the light-detecting element 903 may vary due to various motions of the key. The light-detecting element 903 may determine the time between light emission and light reception to record the change in distance that the light travels. The change in distance may be converted into one or more electric signals by the light-detecting element 903. Thus, the motions of the key may be recorded by the sensor 901.

The light-emitting elements and the light-detecting elements described above are not exhaustive and are not limiting. Numerous other changes, substitutions, variations, alterations, and modifications may be ascertained to one skilled in the art and it is intended that the present disclosure encompass all such changes, substitutions, variations, alterations, and modifications as falling within the scope of the present disclosure.

Figure 10:
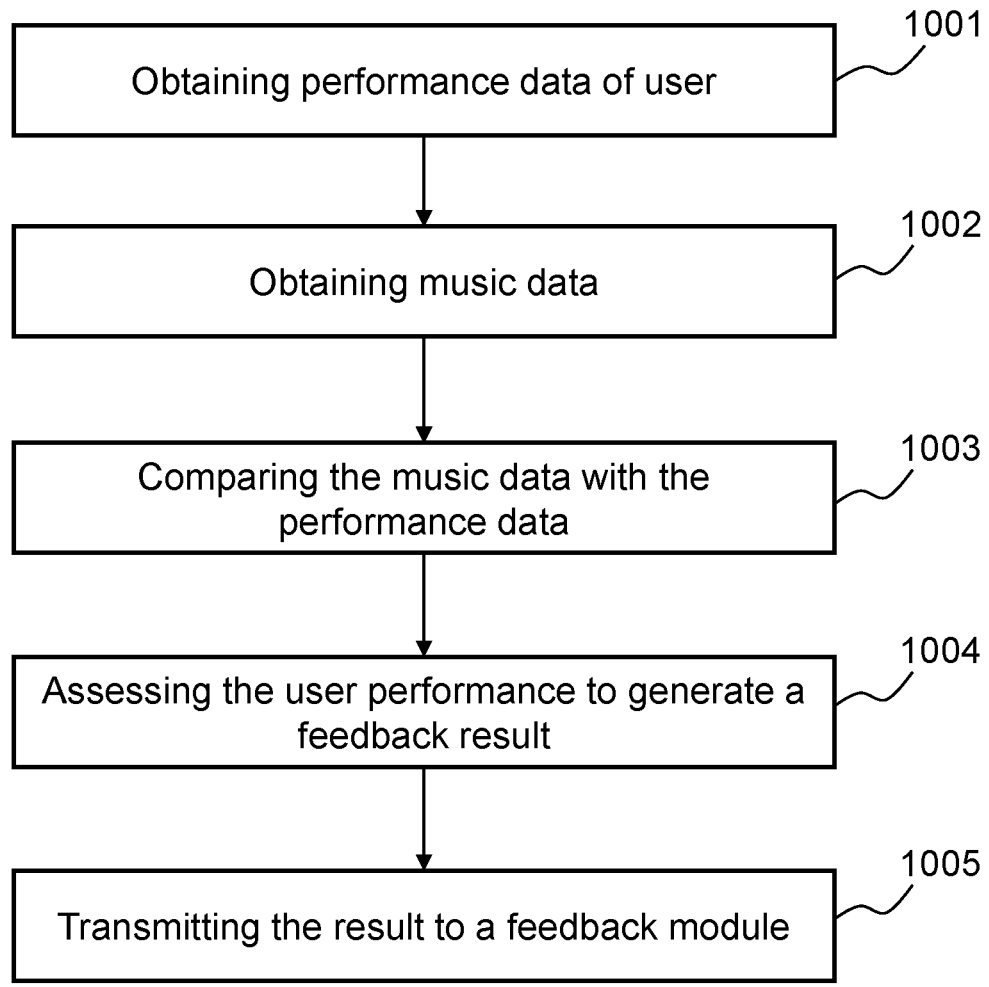
FIG. 10 is a flowchart illustrating a process for a smart detecting and feedback system according to some embodiments of the present disclosure.

FIG. 10 is a flowchart illustrating a process for a smart detecting and feedback system according to some embodiments of the present disclosure. The process may be implemented as a set of instruction in a non-transitory storage medium of the smart piano system 100. When the processing device 104 of the smart piano system 100 execute the set of instructions, the set of instructions may direct the processing device 104 to perform the following steps of the process.

In step 1001, the processing device 104 may obtain performance data of user related to a performance of a piece of music. The performance data may include information about motion of a key, motion of a pedal during the performance, positions of the keys, timing information about the motion of the keys (e.g., a time instant corresponding to depression of the key, a time instant corresponding to release of the key, a time instant corresponding to a position of the key, etc.), a depression strength, velocities of the key during its motion, and/or numbers of key groups or numbers of each individual key, the time player operating on the pedals, and numbers of each individual pedal or numbers of pedal groups. The performance data may be obtained by the signal acquisition engine 201 and/or the external input engine 203. The signal acquisition engine 201 and/or the external input engine 203 may be connected or communicate with the detecting module 102 and database 103 via a wireless connection or a wired connection.

In some embodiments, the performance data may also include user emotion data, attitude data or the like. The emotion data may be used to assess user performance with suitable emotional expression. The attitude data may be used to assess user enthusiasm for playing musical instrument.

In some embodiments, the processing device 104 may also obtain user information relating to user performance, such as user playing custom, musical skill level, hobbies, experience, ability, or the like. The user information may be used to assess user performance. The user information may be stored in the database 103. The user information may be stored in the cloud database 208.

In step 1002, the processing device 104 may obtain music data as reference music data. The music data may be received from the database 103, the external input engine 203, the storage device 202, a cloud database, a server, and/or any other device that is capable of providing music data. The music data may include any information about a piece of music, such as music score, musician information, piano teaching video, piano teaching reference, fingering, musician performance, or the like. The music data may be an audio file, an image, a text, a video or the like, or a combination thereof.

In some embodiments, the piece of music may be identified by a user (e.g., a player/user of the piano). For example, the smart detecting and feedback system 100 may prompt the user to select a music score from a list of pieces of music score and/or to provide information about the piece of music (e.g., by providing one or more user interfaces). As another example, the smart detecting and feedback system 100 may retrieval and identify the music data such as music score by initiating a download of the music data and/or extraction of the music data from a device that stores the music data. In some embodiments, the piece of music may be identified based on audio content related to a performance of the piece of music (e.g., using suitable audio matching, fingering, and processing techniques).

In some embodiments, the processing device 104 may perform functions of retrieving music data in the database 103, the cloud database 208, the storage device 202, or webpage, or the like.

In some embodiments, the processing device 104 may also perform functions of analyzing performance data. For example, the image data of user performance may be used to identify an image and extract feature data such as user micro-expressions, user posture, user fingering or any feature related to user performance from the image.

In step 1003, the music data (i.e., the reference music data) may be compared with the performance data. In some embodiments, the processing device 104 may be used to compare the performance data for a plurality of performed musical notes with model music data for a plurality of model music notes. The model music data may be obtained through processing the music data. In each alternative musical note match lineup, each model musical notes is matched with one of the performed musical notes to form a pair unless a corresponding performed musical note has been identified as missing. The alternative musical note match lineups are different from one another by at least one pair of matching model musical note and performed musical note. For each alternative musical note match lineup, the processing device 104 may analyze a set of note deviations, each note deviation being calculated according to the data for one of the model musical notes and the data for the matching performed musical note. For each alternative musical note match lineup, the processing device 104 may analyze an overall performance deviation of the performance music data from the model music data. In some embodiments, the overall performance deviation may be timing deviation associated with a plurality of key pressing (e.g. a time instant deviation corresponding to a specific key or a time interval deviation between two pressing of a specific key or keys), deviation sequences of one or more operation of the keys, and timing deviation about when a user steps on one or more pedals, a speed of playing a music score, or the like, or the combination thereof.

In step 1004, the processing device 1104 may assess the user performance to generate a feedback content (also referred to herein as "feedback result"). The processing device 104 may assess the user performance based on comparing the music data and the performance data. In some embodiments, the processing device 104 may assess based on user information.

In some embodiments, the feedback content may include learning sample performances from experts, paying more efforts on playing certain musical notes, etc. In some embodiments, the feedback content may be suggestions from a cloud-based storage device, a server, and/or any other device capable of providing the suggestions. For example, the suggestions may be stored in a cloud-based storage device indexed by any possible error. Each error may be directed to one or more suggestions. In some embodiments, the suggestions may be from one or more real-time expert databases. Each real-time expert database may be connected to one or more experts which may provide suggestions after receiving one or more errors. The smart detecting and feedback system may provide the errors to real-time expert databases and extract suggestions from the real-time expert databases. In some embodiments, the suggestions may be generated based on history of errors recorded by the smart detecting and feedback system. For example, if number of certain errors exceeds a threshold value, the smart detecting and feedback system may provide suggestions to prompt the user's notice on the error(s).

In some embodiments, before a user plays a musical instrument, he or she may adjust some settings to increase or decrease a difficulty level of playing. In some embodiments, after a user finishes playing a music score, he or she may adjust some settings to evaluate his or her performance. In some embodiments, the settings may include whether a decorative note and/or a repeat sign should be detected or ignored. For example, if the repeat sign is set to be skipped before a user plays a music score, he or she may merely play other musical notes except the repeat sign, and his or her performance may not influence the evaluation result. As another example, if the decorative note and/or the repeat sign is set not to be used to evaluate the performance, no matter whether the user plays the decorative note and/or the repeat sign during his or her performance or not, or whether the decorative note and/or the repeat sign is played correctly or not, the evaluation result may not be influence. In some embodiments, the settings may include when the number of playing a certain musical note exceeds a predetermined times, the certain musical note may or may not be skipped. The predetermined times may be a suitable value from 1 to 10, or larger than 10. In some embodiments, the predetermined times may be 5.

The settings may also include a speed of playing (e.g., speed of the performance, such as speed of key striking comparing to a reference speed). For example, a user may set a lower speed of playing when he or she is not familiar with a music score. In some embodiments, when a user plays a music score with a relatively high speed (e.g., larger than the reference speed), and when a certain musical note is played incorrectly, but other neighboring musical notes (e.g., the notes before the certain musical note, the musical notes after the certain musical note, or some musical notes before the certain musical note and some musical notes after the certain musical notes) are played correctly, the smart detecting and feedback system 100 may not hinder the user to continue to play the music score.

In some embodiments, a user may choose to stop during the performance. For example, if there are some mistakes in a certain section of a music score during the current performance, he or she may choose to re-play the certain section of the music score instead of continuing playing the next section of the music score. As another example, if sensors or external components in the smart detecting and feedback system 100 detect that a user stops playing for a period of time (e.g., larger than 1 minute), the processing device 104 in the system may realize that the user may be busy with other things, and the evaluation result may not be influenced as well. During a period of performance, a cursor in the display of the system may move correspondingly. The cursor may indicate the location of musical notes where a user is playing. When the user stops playing, the cursor may also stop at the corresponding location.

In step 1005, the processing device 104 may transmit the feedback result to the feedback module 105.

The feedback result may include audio content, video content, images, text, graphics, electric shock, vibration, or the like, or a combination thereof. In some embodiments, the feedback module 105 may display how to play a musical note, a group of musical notes, or a portion of a music score, illustrate a musical notation, or point out a performance error made by a user playing the musical instrument. In some embodiments, the processing device 104 may send the feedback result to a user timely through the feedback module 105 during the performance and/or after finishing playing a predetermined length of music score. The processing device 104 may also transmit the feedback result to the database for storing.

In some embodiments, the feedback result may also include a comparison between different users' records of playing a certain music score. For example, the comparison may be associated with same musical notes and/or same paragraph(s) that the users have played.

The processing device 104 may transmit the result to the feedback via a wireless connection or a wired connection. The wireless connection may be Bluetooth, WLAN, Wi-Fi, Zigbee, Z-Wave, EnOcean, infra-red data association (IrDA), Ultra Wideband (UWB), Near Field Communication Services (NFC), mobile networks (2G, 3G or 4G signal), VPN, shared network, or the like, or a combination thereof.

It is understood that each flowchart illustrations may be implemented by computer program instructions. These computer program instructions may be provided to a controller of a general purpose computer, special purpose computer, and/or other programmable data processing apparatus to produce the instructions, which execute via the controller of the computer and/or other programmable data processing apparatus, create means for implementing the functions specified in the flowchart.

It should be noted that the processes described above is provided for the purposes of illustration, and not intended to limit the scope of the present disclosure. Apparently for persons having ordinary skills in the art, numerous variations and modifications may be conducted under the teaching of the present disclosure. However, those variations and modifications may not depart the protecting scope of the present disclosure. In some embodiments, the detecting module 101 may be configured a microprocessor for processing data. In some embodiments, the different module combined with each other, these are still in the protecting scope of present disclosure.

In some embodiments, the smart detecting and feedback system may include three modes of operation. The first mode may require a music performed by a user be of proper notes but not proper timing with respect to a reference performance. The second mode may require the music performed by the user be of proper timing but not proper notes with respect to the reference performance. The third mode may require the music to be performed with both proper timing and proper notes.

Figure 11:
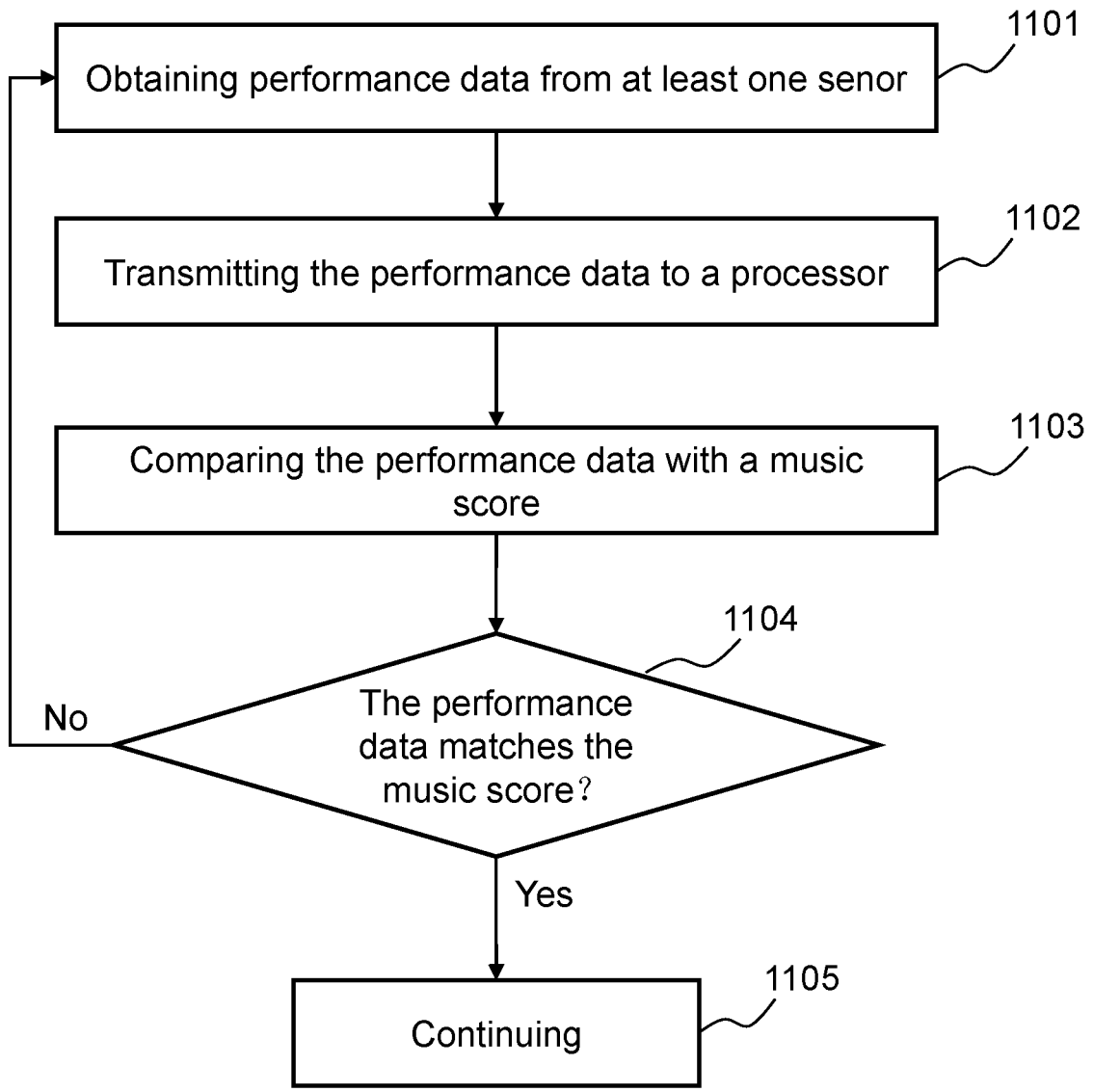
FIG. 11 is a flowchart illustrating a process for a smart detecting and feedback system according to some embodiments of the present disclosure.

FIG. 11 is a flowchart illustrating a process for a smart detecting and feedback system according to some embodiments of the present disclosure. The process may be implemented as a set of instruction in a non-transitory storage medium of the smart piano system 100. When the processing device 104 of the smart piano system 100 execute the set of instructions, the set of instructions may direct the processing device 104 to perform the following steps of the process.

In step 1101, performance data may be obtained by at least one sensor.

The performance data may include note information and timing information. The note information about the performance may be information related to at least one keys or pedals, e.g., key identify information, sequence information of a plurality of keys pressed, strength information of pressing a key, strength information of stepping on a pedal, or the like, or a combination thereof. The timing information may include information related to a speed of playing, e.g., time to press a key, time to release a key, time to step on a pedal, time intervals to press a certain keys or different keys, time intervals to step on a certain pedal or different pedals, or the like, or a combination thereof.

The sensors may be, but is not limited to, an accelerometer, a force sensing resistor (FSR), sonar, an infrared (IR) sensor, a photo sensor, an inertial measurement unit (IMU) sensor, an Attitude/Heading Reference System (AHRS) sensor, a temperature sensor, or a general purpose motion or orientation sensor. In some embodiments, the sensor may be a sound (volume, power, or frequency) measurement device.

In some embodiments, a pressure sensor may be configured under the keyboard and may be connected to the processing device 104 via a wireless connection or a wired connection. When the user touches the key, the pressure exerted on the key may be detected by the pressure sensor. The pressure sensor may capture the value of the pressure and generate a pressure signal. The pressure signal may be obtained by the signal acquisition engine 201 and/or the external input engine 203 and transferred to the controller 204 and data analysis unit 205.

In some embodiments, the sensor may be configured in a smart accessory such as a smart finger ring, a smart wristband, a smart glove, a pair of smart glasses, or the like.

In step 1102, the performance data may be transmitted to a processor. In some embodiments, the processor may be configured in the detecting module 101. In some embodiments, the processor may be configured in the processing device 104. The sensor may communicate or be connected with the processor via wireless Bluetooth, WLAN, Wi-Fi, Zigbee, Z-Wave, EnOcean, infra-red data association (IrDA), Ultra Wideband (UWB), Near Field Communication Services (NFC), mobile networks (2G, 3G or 4G signal), VPN, shared network, or the like, or a combination thereof.

In step 1103, the processor may compare the performance data with a music score (e.g., a reference music score).

In some embodiments, the performance data may be analyzed by the data analysis unit 205 before being compared with the music score. In some embodiments, a photo sensor may be configured to obtain a picture of finger position on a keyboard when a user playing a piece of music. The photo sensor may convert the optics signal to an electric signal, and transfer the electric signal to the data analysis unit 205. The analysis unit 205 may identify the picture and capture the finger position on the keyboard.

The data analysis unit 205 may also obtain a music score from the database 102.

The music score may indicate which note(s) should be played and when the note(s) should be played. In some embodiments, the music score may be retrieved from the database 102 by user. In some embodiments, the music score may be retrieved from a webpage and downloaded by user voice controlled. In some embodiments, the music score may be processed to generate reference performance data. The reference performance data may refer to a "standard" way to play the music score as reference. For example, a music score may indicate that a user should play a whole note with a first finger (reference performance data). The processing device 104 may compare the performance data with the reference performance data to determine whether an error happens. In some embodiments, the performance data obtained in step 1101 may be processed to generate processed performance data. The processed performance data may include which note(s) has been played, when the note(s) is played, or the like.

In some embodiments, the feedback module 105 may display the music score on the screen, and even display a visual keyboard. The motion of the visual key may be accordance with the music score.

In step 1104 and 1105, if the performance data matches the music score, the processing device 104 may not generate a signal to hinder the user to play the music score.

In some embodiments, the pressure sensor may obtain the motion of a key, and determine the note played by the user. For example, the processing device 104 may determine notes which should be played according to the music score, and compare to the played note. If the played note matches with the music score, the user may be allowed to continue to play the next note. If the played note does not match with the music note, the system may provide a reminder to hinder the user to continue to play next note until the user plays a correct note. The reminder may be an electronic shock, vibration, a signal light, a piece of sound, or the like, or a combination thereof. As another example, if the time when the user played the note matches the time when the note should be played, the user may be allowed to continue playing the music score and no reminder may be generated; if the time when the user played the note does not match the time when the note should be played, the user may be not allowed to continue play the music score or a reminder may be generated to indicate an error associated with timing happens.

In some embodiments, the smart detecting and feedback system 100 may be configured to implement an error detection mode and/or an error detection module. For example, the error detection mode and/or module may detect errors in the performance information. The errors in the performance information may include wrong timing of operating one or more keys and/or pedals, wrong operation sequences of one or more keys and/or pedals, inappropriate strength of operating one or more keys and/or pedals, etc. If the user makes an error in the performance of a piece of music, the system 100 may real-time detect the error, and hinder the user to continue to play the piece of music. The smart detecting and feedback system 100 may also be capable of providing suggestions for the player. The suggestions may be based on the errors in the performance information. For example, the suggestions may include learning a sample performance from an expert or a teacher, paying more efforts on playing certain musical notes or sections, etc.

In some embodiments, the system may be configured with an external component in the music instrument to hinder the music instrument working when a user play a wrong note. In some embodiments, the system may remind the user via the external component to provide a reminder, e.g., an electronic shock, vibration, a signal light, a piece of sound, or the like, or a combination thereof. In some embodiments, the system may display the error on the screen or via sound to suggest the user which musical note should be played.

Figure 12:
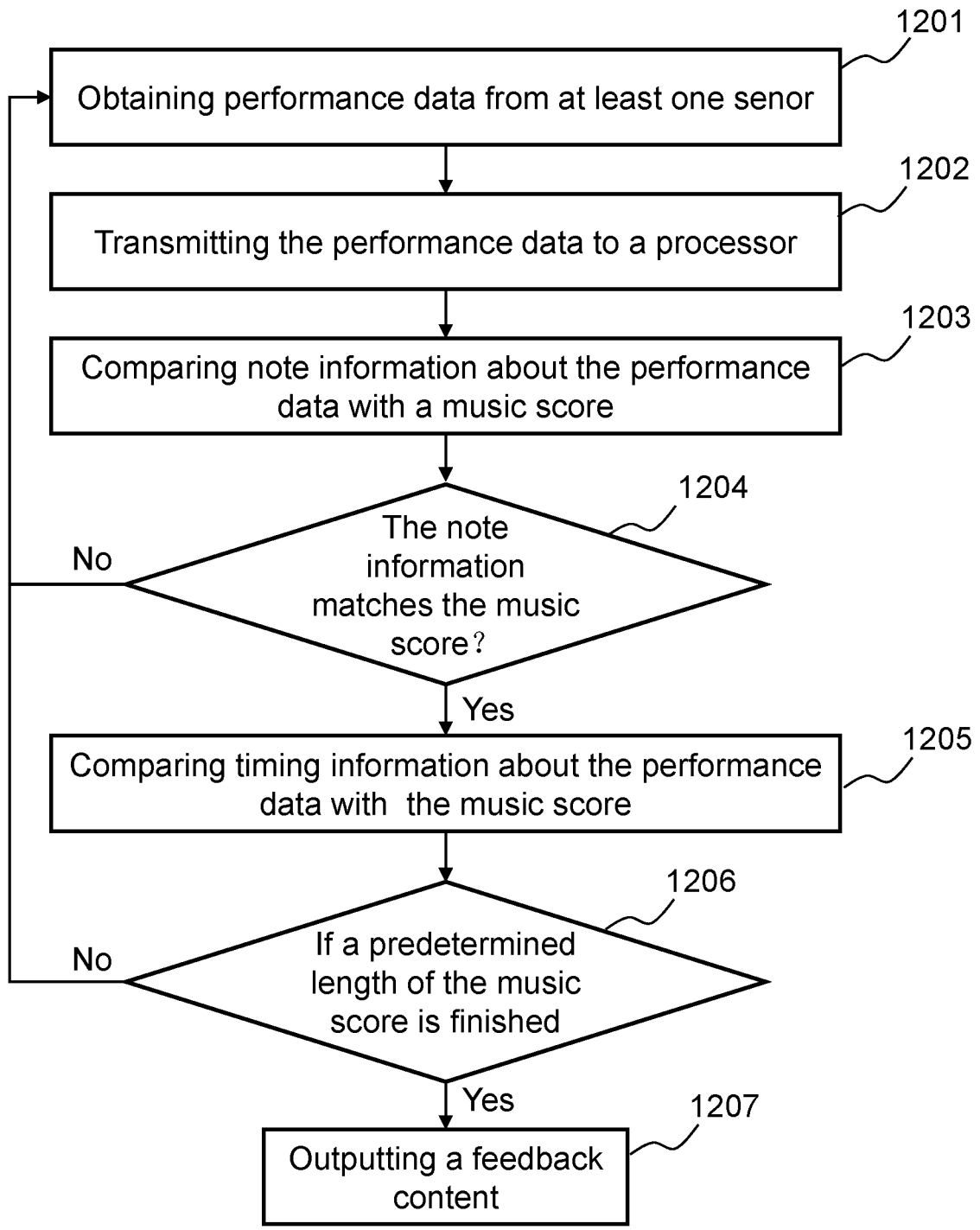
FIG. 12 is a flowchart illustrating another process for a smart detecting and feedback system according to some embodiments of the present disclosure.

FIG. 12 is a flowchart illustrating another process for a smart detecting and feedback system according to some embodiments of the present disclosure. The process may be implemented as a set of instructions in a non-transitory storage medium of the smart piano system 100. When the processing device 104 of the smart piano system 100 execute the set of instructions, the set of instructions may direct the processing device 104 to perform the following steps of the process.

In step 1201, the processing device 104 may direct at least one sensor to obtain and/or detect performance data of a user.

The sensor may be similar with the sensor described in step 1101. The performance data obtained in step 1201 may include note information and timing information. The note information about the performance may be information related to at least one keys or pedals, e.g., key identify information, sequence information of a plurality of keys pressed, strength information of pressing a key, strength information of stepping on a pedal, or the like, or a combination thereof. The timing information may include information related to a speed of playing, e.g., time to press a key, time to release a key, time to step on a pedal, time intervals to press a certain keys or different keys, time intervals to step on a certain pedal or different pedals, or the like, or a combination thereof.

In step 1202, the performance data may be transmitted to a processor, such as the processing device 104.

In some embodiments, the processor, such as the processing device 104, may be configured in the detecting module 101. The sensor may communicate or be connected with the processor via wireless Bluetooth, WLAN, Wi-Fi, Zigbee, Z-Wave, EnOcean, infra-red data association (IrDA), Ultra Wideband (UWB), Near Field Communication Services (NFC), mobile networks (2G, 3G or 4G signal), VPN, shared network, or the like, or a combination thereof.

In step 1203, the processing device 104 may compare the note information about the performance data with a music score (also referred herein as the reference music score).

In some embodiments, the reference music score may be retrieved from the database 102. In some embodiments, the reference music score may be retrieved from a webpage.

In some embodiments, the note information may be analyzed and extracted by the data analysis unit 205 before being compared with the reference music score. In some embodiments, a photo sensor may be configured to obtain a picture of finger position on a keyboard when user playing a piece of a music. The photo sensor may convert the optics signal to an electric signal, and transfer the electric signal to the data analysis unit 205. The analysis unit 205 may identify the picture and capture the finger position on the keyboard. The data analysis unit 205 may also obtain a music score from the database 102.

In some embodiments, the feedback module 105 may display the music score on the screen, and even display a visual keyboard. The motion of the visual key may be in accordance with the music score.

In step 1204, the processing device 104 may determine if the note information matches the reference music score.

If the note information matches the reference music score (e.g., if a similarity between the note information and the music score is greater than a threshold value), the process may go to step 1205. In some embodiments, if the note information does not match with the reference music score (e.g., if the similarity between the note information and the music score is not greater than the threshold value), the system 100 may record the difference between the note information and the reference music score, and the system may allow the user to continue to play the music score. In some embodiments, if the note information does not match with the reference music score, the system 100 may provide a reminder to hinder the user to continue to play next musical note and keep monitoring key motion and/or pedal motion. In some embodiments, the system 100 may be configured with an external component in the music instrument to hinder the music instrument working when user play a wrong note. In some embodiments, the system 100 may remind user via electronic shock, vibration, a light signal, audio content, video content, images, text, graphics, or the like, or a combination thereof. In some embodiments, the system 100 may display the error on the screen or via sound to suggest user which musical note should be played.

In step 1205, the processing device 104 may compare the timing information about the performance data with the reference music score.

In some embodiments, the sensor in the smart detecting and feedback system 100 may obtain the motion of a key, and determine a time point of playing a certain musical note (also referred to herein as "first time point"). The processing device 104 may determine the corresponding time of playing the certain musical note (also referred to herein as "second time point") according to the reference music score. The processing device 104 may compare the first time point with the second time point.

In some embodiments, the timing information may be analyzed and extracted by the data analysis unit 205 before being compared with the music score. In some embodiments, the performance data may be obtained by the signal acquisition engine 201 and/or the external input engine 203 and transferred to the controller 204 and data analysis unit 205. The analysis unit 205 may analyze the performance data and extract the certain timing information.

In step 1206, the processing device 104 may determine whether a predetermined length of the reference music score is finished.

The predetermined length of the reference music score may be a grouping of notes, e.g., a paragraph, a section, a chapter, or the like. If the predetermined length of the reference music score is not finished, the user may be allowed to continue to play the next musical note.

If the predetermined length of the reference music score is finished, the system 100 may output a feedback content in step 1207. The feedback content may be provided by the feedback module 105. In some embodiments, the feedback content may include information to inform and/or remind the user the difference between the user's performance and a reference musical performance. The reference musical performance may include but is not limited to a standard musical performance generated automatically by the processing device 104 based on the reference music score, a teacher's musical performance, or the like. In some embodiments, the feedback content may also include a comparison between the user's present performance and the historical records of the user, a comparison between the user's present performance and other users' historical records, or the like. The comparison may include the types of musical notes that a user is easy to play wrongly, the types of rhythms that a user is easy to play wrongly, the types of rhythms that most of the users are easy to play wrongly, or the like, or a combination thereof. In some embodiments, the feedback content may be in the form of audio content, video content, images, text, graphics, electric shock, vibration, or the like, or a combination thereof.

In some embodiments, the feedback module 105 may display the reference music score on the screen, and even display a visual keyboard. The motion of the visual key may be accordance with the reference music score. In some embodiments, the detecting module 102 may keep monitoring a user's performance. If the user has stopped playing for a predetermined time, the visual key may stay in the present state until the user starts to continue. The predetermined time may be 5 seconds, 1 minute, or the like. The length of predetermined time may be set by the user or stay default.

Through the feedback content, the smart detecting and feedback system 100 may inform the user the mistakes he/she should pay attention to or other suggestions. When the user plays another predetermined length of music score, he or she may improve his or her performance.

It should be noted that the components of the controller provided above are provided for the purposes of illustration, and not intended to limit the scope of the present disclosure. Apparently for persons having ordinary skills in the art, numerous variations and modifications may be conducted under the teaching of the present disclosure. However, those variations and modifications may not depart the protecting scope of the present disclosure.

It should be borne in mind, however, that all of these and similar terms are to be associated with the appropriate physical quantities and are merely convenient labels applied to these quantities. Unless specifically stated otherwise, as apparent from the following discussion, it is appreciated that throughout the description, discussions utilizing terms such as "sending," "receiving," "generating," "providing," "calculating," "executing," "storing," "producing," "determining," "obtaining," "calibrating," "recording," or the like, refer to the action and processes of a computer system, or similar electronic computing device, that manipulates and transforms data represented as physical (electronic) quantities within the computer system's registers and memories into other data similarly represented as physical quantities within the computer system memories or registers or other such information storage, transmission or display devices.

The terms "first," "second," "third," "fourth," etc. as used herein are meant as labels to distinguish among different elements and may not necessarily have an ordinal meaning according to their numerical designation.

In some implementations, any suitable computer readable media may be used for storing instructions for performing the processes described herein. For example, in some implementations, computer readable media can be transitory or non-transitory. For example, non-transitory computer readable media can include media such as magnetic media (such as hard disks, floppy disks, etc.), optical media (such as compact discs, digital video discs, Blu-ray discs, etc.), semiconductor media (such as flash memory, electrically programmable read only memory (EPROM), electrically erasable programmable read only memory (EEPROM), etc.), any suitable media that is not fleeting or devoid of any semblance of permanence during transmission, and/or any suitable tangible media. As another example, transitory computer readable media can include signals on networks, in connectors, conductors, optical fibers, circuits, any suitable media that is fleeting and devoid of any semblance of permanence during transmission, and/or any suitable intangible media.

It should be noted that the piano equipped with the smart piano system in some specific embodiments is provided for the purposes of illustration, and not intended to limit the scope of the present disclosure. Apparently for persons having ordinary skills in the art, numerous variations and modifications may be conducted under the teaching of the present disclosure. However, those variations and modifications may not depart the protecting scope of the present disclosure.

Furthermore, the recited order of processing elements or sequences, or the use of numbers, letters, or other designations therefore, is not intended to limit the claimed processes and methods to any order except as may be specified in the claims. Although the above disclosure discusses through various examples what is currently considered to be a variety of useful embodiments of the disclosure, it is to be understood that such detail is solely for that purpose, and that the present disclosure are not limited to the disclosed embodiments, but, on the contrary, are intended to cover modifications and equivalent arrangements that are within the spirit and scope of the disclosed embodiments. For example, although the implementation of various components described above may be embodied in a hardware device, it may also be implemented as a software only solution—e.g., an installation on an existing server or mobile device.

Similarly, it should be appreciated that in the foregoing description of embodiments of the present disclosure, various features are sometimes grouped together in a single embodiment, figure, or description thereof for the purpose of streamlining the disclosure aiding in the understanding of one or more of the various inventive embodiments. This method of disclosure, however, is not to be interpreted as reflecting an intention that the claimed subject matter requires more features than are expressly recited in each claim. Rather, inventive embodiments lie in less than all features of a single foregoing disclosed embodiment.

What is claimed is:

1. A smart musical instrument system for replaying user performance with auto-play, electronic sound source or video, the system comprising:
   a plurality of sensors configured to obtain performance data of a user, the plurality of sensors including a first sensor configured to obtain first performance data of the user, and the performance data including the first performance data indicating operations of a musical instrument; and
   a processing device in communication with the plurality of sensors, configured to:
      compare the performance data with reference music data to generate a comparison result;
      obtain at least one setting, wherein the setting indicates a difficulty level of playing the musical instrument; and
      generate the feedback based on the comparison result and the setting.

2. The smart musical instrument system of claim 1, wherein the plurality of sensors further includes a second sensor configured to obtain second performance data associated with at least one of hand posture of the user, body feature of the user, or brain waves of the user, wherein the performance data further comprises the second performance data.

3. The smart musical instrument system of claim 2, wherein the second sensor includes at least one of
   a plurality of finger rings, configured to be worn on at least one finger of a hand of the user and to measure at least one of a position, a motion, or force of the finger; or
   a camera, configured to obtain an image of the hand posture of the user.

4. The smart musical instrument system of claim 2, wherein the second sensor includes a brain wave detector configured to measure the brain waves of the user.

5. The smart musical instrument system of claim 1, wherein the processing device is further configured to:
   process the performance data to generate processed performance data; and
   compare the processed performance data with the reference music data to generate the comparison result.

6. The smart musical instrument system of claim 5, wherein the processed performance data includes a played note that is played by the user, and the processing device is further configured to:
   determine a reference note that should be played based on the reference music data; and
   determine whether the played note matches the reference note; and
   generate a reminder indicating an error happens when the played note does not match the reference note.

7. The smart musical instrument system of claim 1, wherein the setting comprises at least one of
   whether a certain sign in the reference music data should be detected or ignored, wherein the certain sign indicates a decorative note or a repeat sign,
   whether a first musical note should be skipped if the first musical note is played in a wrong way for predetermined times,
   whether a reminder should be transmitted to the user when a second musical note is played incorrectly, but neighboring notes are played correctly, wherein the neighboring notes away from the second musical noted within a predetermined distance in the reference music data, or
   a speed of playing.

8. The smart musical instrument system of claim 1, wherein the processing device is further configured to:
   obtain a plurality of historical feedbacks from historical performance data of the user;
   generate a statistic result indicating characteristics of the historical performance data based on the plurality of historical feedbacks; and
   determine a performance instruction to the user based on the statistic result.

9. The smart musical instrument system of claim 1, wherein the musical instrument comprises at least one key or pedal; and wherein
   the first performance data comprises at least one of
   key identity information,
   timing information and strength information of key pressing,
   sequence information of a plurality of key pressing,
   timing information and strength information of pedal stepping on,
   musical note information produced by key, or
   musical note information produced by pedal motion.

10. A method for operating a smart musical instrument system for replaying user performance with auto-play, electronic sound source or video, the method comprising:
obtaining, by a plurality of sensors, performance data of a user, the performance data including first performance data indicating operations of a musical instrument obtained by a first sensor in the plurality of sensors, wherein the plurality of sensors includes the first sensor;
comparing, by a processing device, the performance data with reference music data to generate a comparison result;
obtaining, by the processing device, at least one setting, wherein the setting indicates a difficulty level of playing the musical instrument; and
generating, by the processing device, the feedback based on the comparison result and the setting.

11. The method of claim 10, wherein the performance data further includes second performance data, obtained by a second sensor, associated with at least one of hand posture of the user, body feature of the user, or brain waves of the user.

12. The method of claim 11, wherein the second sensor includes a plurality of fingers and a camera, the method further includes:
measuring at least one of a position, a motion, or force of a finger by the plurality of finger rings worn on at least one finger of a hand of the user; or
obtaining an image of the hand posture of the user by the camera.

13. The method of claim 11, wherein the second sensor includes the brain wave detector and the brain waves of the user are measured by the brain wave detector.

14. The method of claim 10, further includes:
processing, by the processing device, the performance data to generate processed performance data; and
comparing, by the processing device, the processed performance data with the reference music data to generate the comparison result.

15. The method of claim 14, wherein the processed performance data comprises a played note that is played by the user, the method further including:
determining, by the processing device, a reference note that should be played based on the music data; and
determining, by the processing device, whether the played note matches the reference note; and
generating, by the processing device, a reminder indicating an error happens when the played note does not match the reference note.

16. The method of claim 10, wherein the setting includes at least one of:
whether a certain sign in the reference music data should be detected or ignored, wherein the certain sign indicates a decorative note or a repeat sign,
whether a first musical note should be skipped if the first musical note is played in a wrong way for predetermined times,
whether a reminder should be transmitted to the user when a second musical note is played incorrectly, but neighboring notes are played correctly, wherein the neighboring notes are away from the second musical noted within a predetermined distance in the reference music data, or
a speed of playing.

17. The method of claim 10, further including:
obtaining, by the processing device, a plurality of historical feedbacks from historical performance data of the user;
generating, by the processing device, a statistic result indicating characteristics of the historical performance data based on the plurality of historical feedbacks; and
determining, by the processing device, a performance instruction to the user based on the statistic result.

18. A non-transitory computer readable medium comprising at least one set of instructions, wherein when executed by at least one processor, the at least one set of instructions cause the at least one processor to effectuate a method comprising:
obtaining, by a plurality of sensors, performance data of a user, the performance data including first performance data indicating operations of a musical instrument obtained by a first sensor in the plurality of sensors, wherein the plurality of sensors includes the first sensor;
comparing, by a processing device, the performance data with reference music data to generate a comparison result;
obtaining, by the processing device, at least one setting, wherein the setting indicates a difficulty level of playing the musical instrument; and
generating, by the processing device, the feedback based on the comparison result and the setting.

19. The method of claim 10, wherein the musical instrument comprises at least one key or pedal; and wherein the first performance data comprises at least one of
key identity information,
timing information and strength information of key pressing,
sequence information of a plurality of key pressing,
timing information and strength information of pedal stepping on,
musical note information produced by key, or
musical note information produced by pedal motion.

20. The non-transitory computer readable medium of claim 18, wherein the performance data further includes second performance data, obtained by a second sensor, associated with at least one of hand posture of the user, body feature of the user, or brain waves of the user.

* * * * *